US011277978B2

(12) United States Patent
Fitzwater

(10) Patent No.: US 11,277,978 B2
(45) Date of Patent: Mar. 22, 2022

(54) VINYL RAISED BED GARDEN PLANTER KIT WITH MODULAR EXTENSION OPTION

(71) Applicant: Stephen Fitzwater, West Jordan, UT (US)

(72) Inventor: Stephen Fitzwater, West Jordan, UT (US)

( * ) Notice: Subject to any disclaimer, the term of this patent is extended or adjusted under 35 U.S.C. 154(b) by 84 days.

(21) Appl. No.: 16/246,175

(22) Filed: Jan. 11, 2019

(65) Prior Publication Data

US 2020/0221650 A1 Jul. 16, 2020

(51) Int. Cl.
*A01G 9/28* (2018.01)
*A01G 9/02* (2018.01)

(52) U.S. Cl.
CPC ............ *A01G 9/28* (2018.02); *A01G 9/028* (2013.01)

(58) Field of Classification Search
CPC . A01G 9/02; A01G 9/28; A01G 9/028; A01G 9/00; A01G 9/027; A01G 9/0295;
(Continued)

(56) References Cited

U.S. PATENT DOCUMENTS 8,424,258 B2 * 4/2013 Modica ................. E04D 11/002
52/285.4
8,904,706 B1 * 12/2014 Smith ...................... A01G 9/00
47/65.6
(Continued)

FOREIGN PATENT DOCUMENTS

AU 2016208286 A1 2/2018
GB 2472865 A 2/2011
(Continued)

OTHER PUBLICATIONS

Cambridge Raised Planter Instructions; New England Arbors; Oct. 2017; Version 3.3/080817; pp. 1-7 (Year: 2017).*
(Continued)

*Primary Examiner* — Timothy D Collins
*Assistant Examiner* — Brittany A Lowery
(74) *Attorney, Agent, or Firm* — Morriss O'Bryant; Compagni Cannon, PLLC

(57) ABSTRACT

A raised garden box assembly. The raised garden box assembly may include a plurality of hollow sidewalls, each hollow sidewall may have a top rail, a bottom rail, an inner side member and an outer side member, where the top rail is connected to an outer side member and an inner side member and the bottom rail is also connected to the inner side member and the outer side member. The outer side member and the inner side member may form a hollow interior space and each of the plurality of hollow sidewalls may include a plurality of support ribs, each of the plurality of support ribs may directly contact the outer side member and the inner side member. The top rail, bottom rail, outer side member, inner side member and plurality of support ribs of each hollow sidewall may be integrally formed as a single unitary piece via an extrusion process. The raised garden box assembly may also include a plurality of hollow corner posts, each corner post having a first and second opening, where each of the first and second openings may receive a terminating end of one of the plurality of hollow sidewalls, the plurality of hollow sidewalls and corner posts forming an enclosure.

48 Claims, 42 Drawing Sheets

(58) Field of Classification Search
CPC .......... E04H 2017/1465; E04H 17/165; E04H 17/168; E04H 17/1439; E04H 17/1447; E04C 2/388
See application file for complete search history.

(56) References Cited

U.S. PATENT DOCUMENTS

| | | |
|---|---|---|
| 9,149,006 B1 | 10/2015 | Pope |
| 9,617,705 B2* | 4/2017 | Breedlove .............. E21D 11/102 |
| 2009/0194753 A1* | 8/2009 | Stucker ............... E04H 17/1421 256/31 |
| 2010/0242357 A1 | 9/2010 | Vogler et al. |
| 2012/0061636 A1* | 3/2012 | Williams, Sr. ...... E04H 17/1447 256/64 |
| 2012/0319067 A1* | 12/2012 | Millar ................. E04H 17/1439 256/19 |
| 2018/0242534 A1* | 8/2018 | Herridge ................ A01G 22/00 |
| 2019/0177998 A1* | 6/2019 | Sheehan ............. E04H 17/1404 |

FOREIGN PATENT DOCUMENTS

| | | |
|---|---|---|
| KR | 101169351 B1 | 7/2012 |
| WO | WO2014085859 A1 | 6/2014 |

OTHER PUBLICATIONS

Fitzwater, Stephen, Declaration of Stephen Fitzwater Regarding Non-Documentary Potential Prior Art, signed Dec. 16, 2020, with Exhibits A through D.

\* cited by examiner

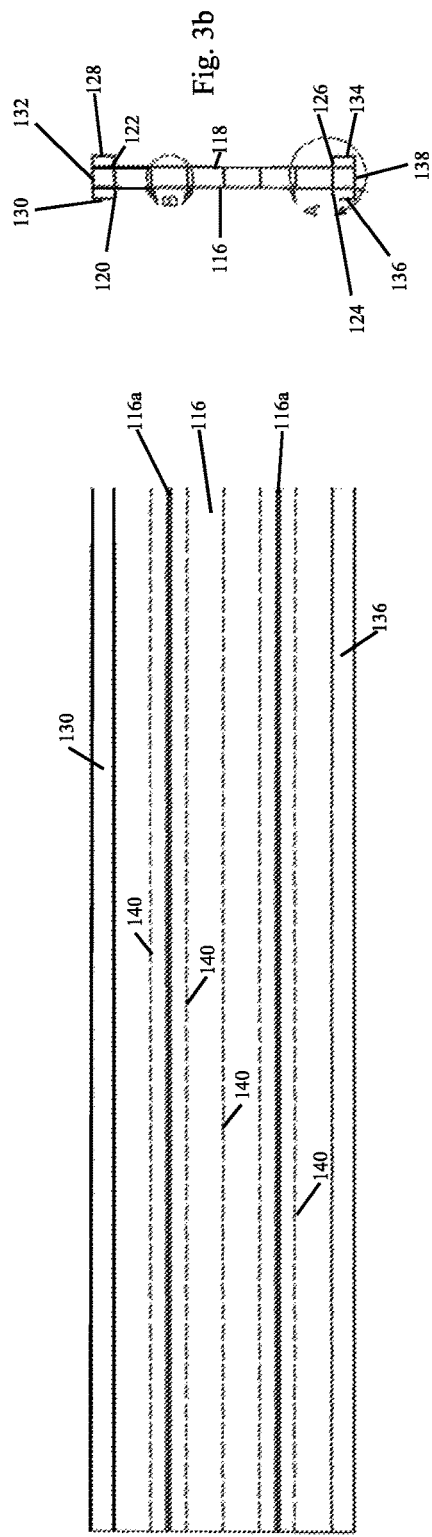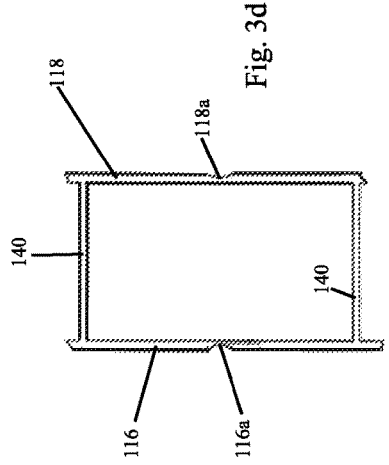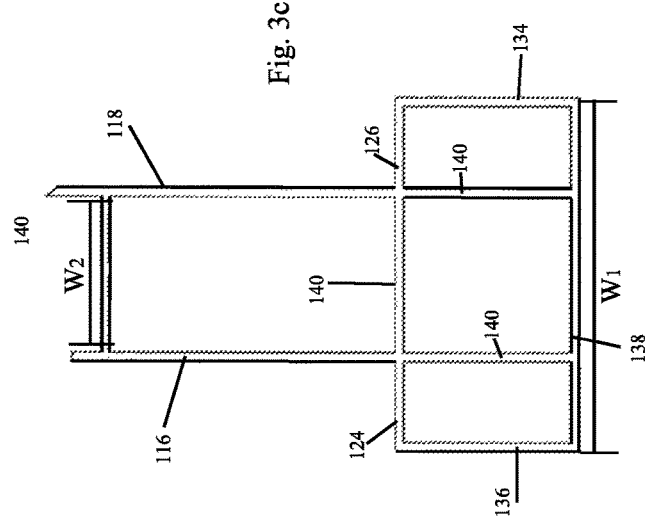

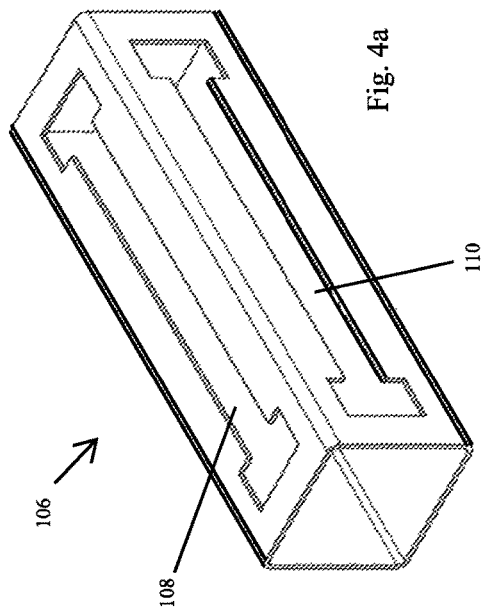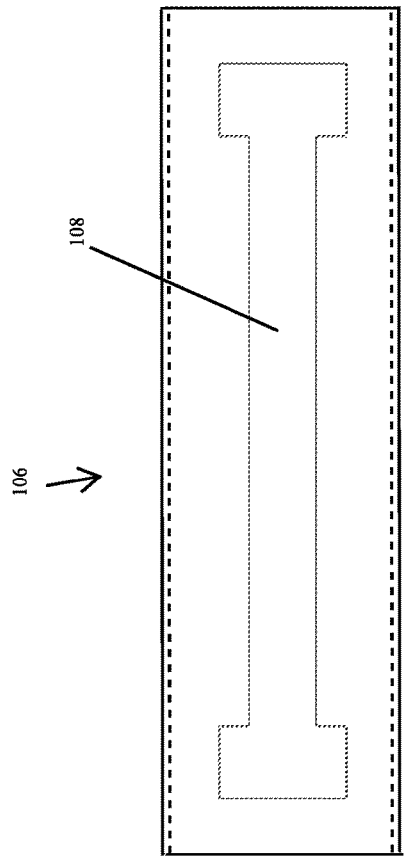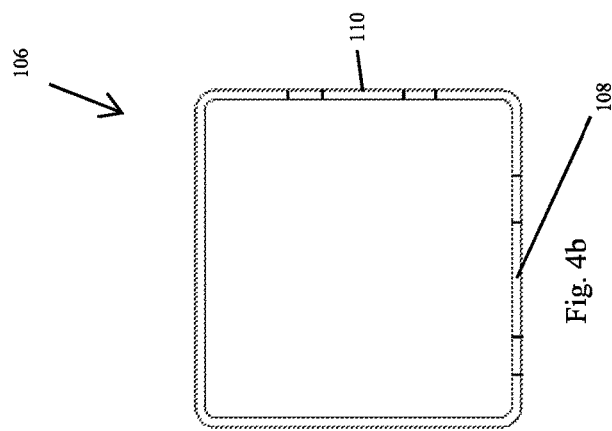

VINYL RAISED BED GARDEN PLANTER KIT WITH MODULAR EXTENSION OPTION

CROSS-REFERENCE TO RELATED APPLICATIONS

Not Applicable.

STATEMENT REGARDING FEDERALLY SPONSORED RESEARCH OR DEVELOPMENT

Not Applicable.

BACKGROUND

1. The Field of the Present Disclosure

The present disclosure relates generally to, garden boxes and more specifically to pre-fabricated raised garden box assemblies.

2. Description of Related Art

It is common practice to provide modular raised garden beds. Conventionally, modular raised garden beds have been fabricated out of various materials, including wood, plastic, vinyl, composite materials or other durable materials.

Each material tends to have its own advantages and disadvantages, for example, wood may be aesthetically pleasing and biodegradable, however, wood deteriorates at a more rapid pace, has a tendency to warp, and is respectively, very heavy. Plastic and composite materials are respectively more inexpensive, lightweight and resistive to degradation, however, these materials tend to break or deform more easily.

Conventional raised garden beds made of plastic or vinyl have typically been fabricated in multiple pieces that could be constructed or assembled on site of the desired location of the raised garden bed. For example, a convention raised garden bed may include at least four sidewalls and four corner posts. However, the sidewalls may be fabricated as multiple components, such as multiple stacked panels. These panels would then need to be glued or otherwise fastened together, either on site of the raised garden bed, or at an offsite location. Glue or other fastening means while inexpensive, require additional labor, and thus labor costs, and tend to provide a substantially weaker sidewall than a sidewall made of a single unitary construction. Additionally, because these conventional sidewalls require multiple component pieces, each piece must be cut independently to the same measurements, before assembly, which again, increases labor and corresponding costs.

The prior art is thus characterized by several disadvantages that are addressed by the present disclosure. The present disclosure minimizes, and in some aspects eliminates, the above-mentioned failures, and other problems, by utilizing the methods and structural features described herein.

The features and advantages of the present disclosure will be set forth in the description which follows, and in part will be apparent from the description, or may be learned by the practice of the present disclosure without undue experimentation. The features and advantages of the present disclosure may be realized and obtained by means of the instruments and combinations particularly pointed out in the appended claims. Any discussion of documents, acts, materials, devices, articles or the like which has been included in the present specification is not to be taken as an admission that any or all of these matters form part of the prior art base, or were common general knowledge in the field relevant to the present disclosure as it existed before the priority date of each claim of this application.

BRIEF DESCRIPTION OF THE DRAWINGS

The features and advantages of the disclosure will become apparent from a consideration of the subsequent detailed description presented in connection with the accompanying drawings in which:

FIG. 3a is a front view of a hollow sidewall of the raised bed garden box assembly made in accordance FIG. 1;

FIG. 3b is a side view of the hollow sidewall of the raised bed garden box assembly made in accordance FIG. 1;

FIG. 3c is a zoomed-in side view of section B of the hollow sidewall of the raised bed garden box assembly made in accordance FIG. 3b;

FIG. 3d is a zoomed-in side view of section A of the hollow sidewall of the raised bed garden box assembly made in accordance FIG. 3b;

FIG. 4a is a perspective view of a corner post in accordance with the principles of the present disclosure;

FIG. 4b is a top view of the corner post in accordance with the principles of FIG. 4a;

FIG. 4c is a side view of the corner post in accordance with the principles of FIG. 4a;

FIG. 8b is a top view of the corner post in accordance with the principles of FIG. 8a;

FIG. 8c is a side view of the corner post in accordance with the principles of FIG. 8a;

Figure 9:
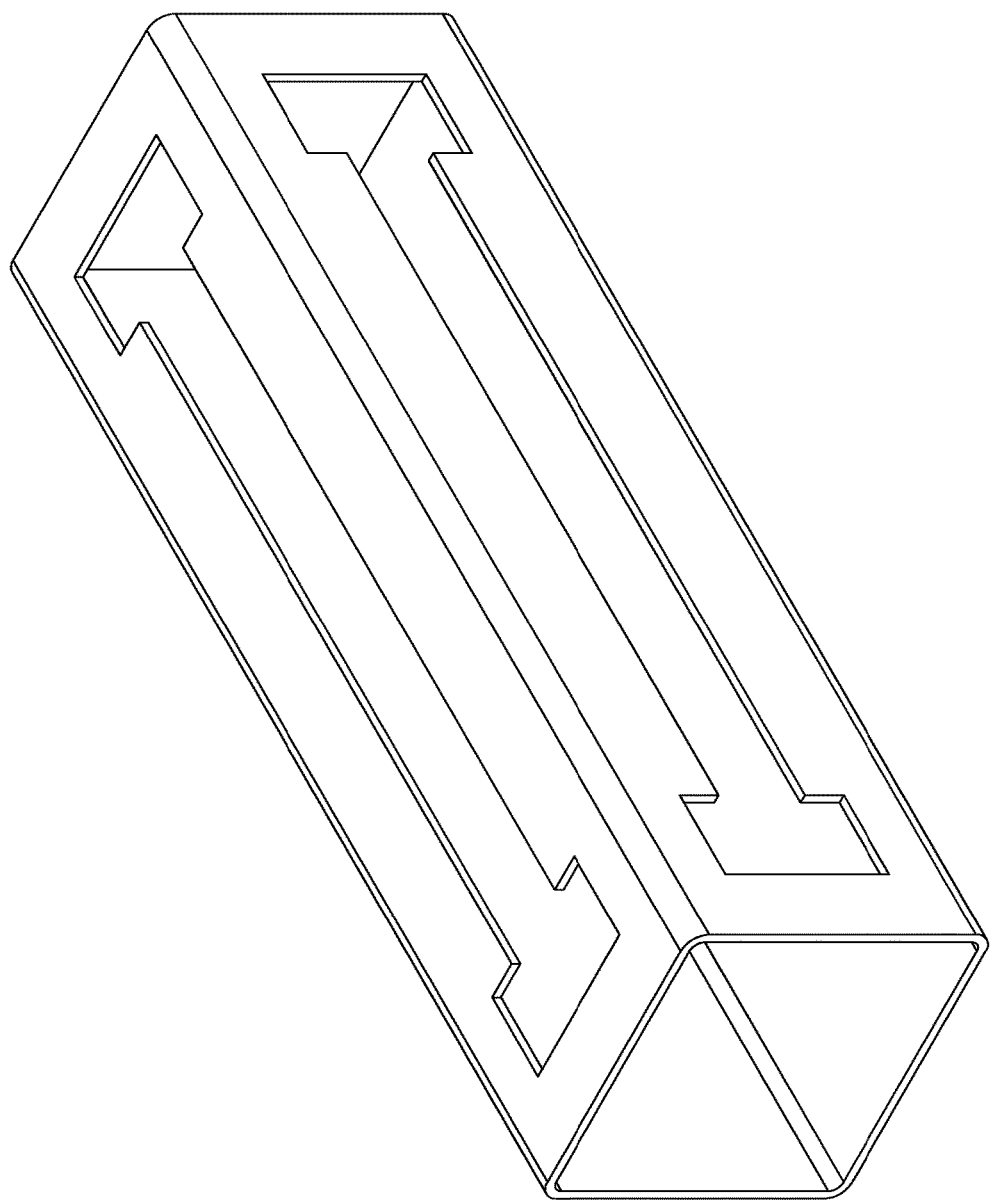
FIG. 9 is a perspective view of a corner post made in accordance with the principles of the present disclosure.
Figure 61:
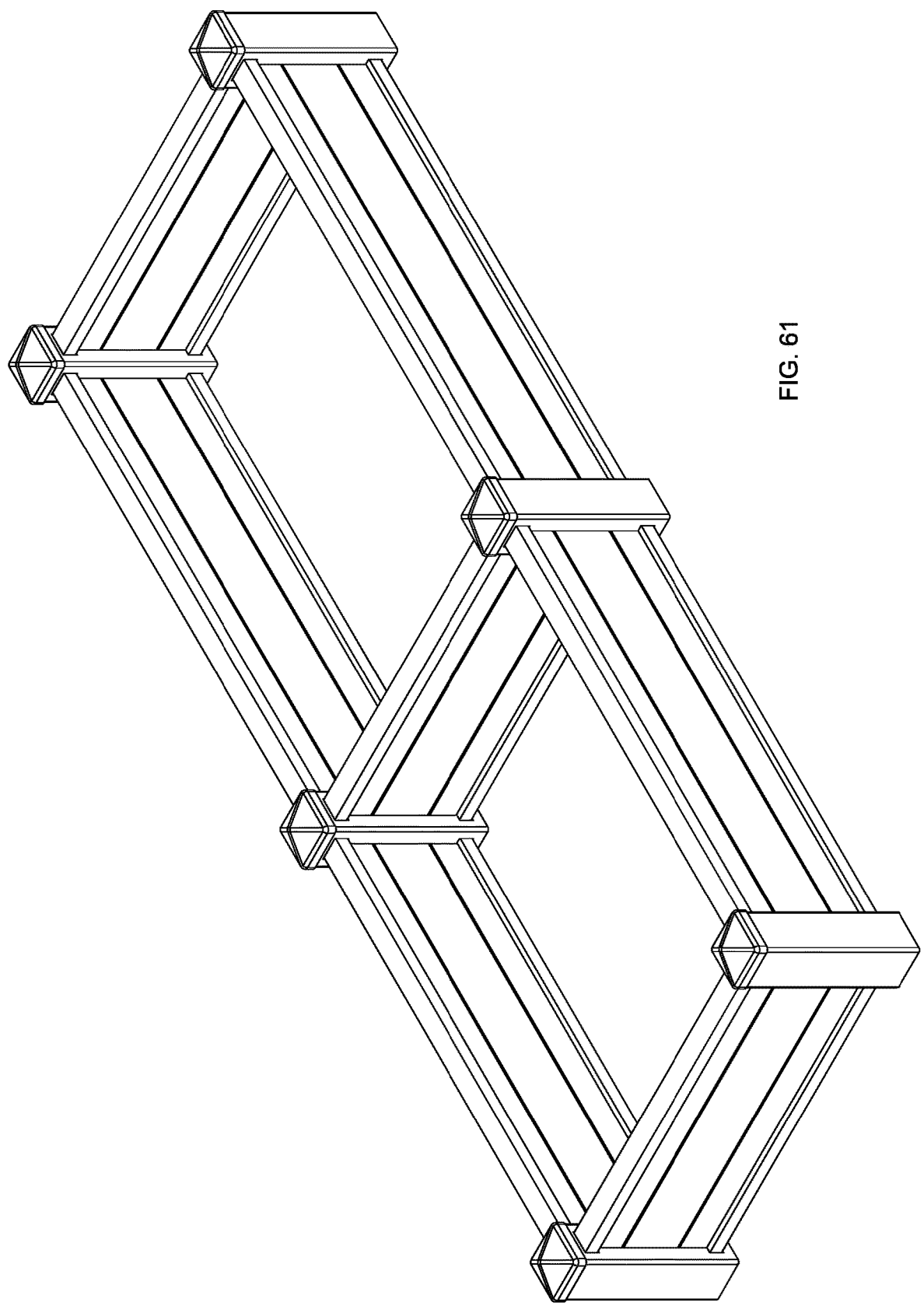
FIG. 61 is a perspective view of a garden having two sections and made in accordance with the principles of the present disclosure.

Regarding the embodiments shown in FIGS. 9-61, the broken lines are shown for illustrative purposes only and form no part of any claimed design.

DETAILED DESCRIPTION

For the purposes of promoting an understanding of the principles in accordance with the disclosure, reference will now be made to the embodiments illustrated in the drawings and specific language will be used to describe the same. It will nevertheless be understood that no limitation of the scope of the disclosure is thereby intended. Any alterations and further modifications of the inventive features illustrated herein, and any additional applications of the principles of the disclosure as illustrated herein, which would normally occur to one skilled in the relevant art and having possession of this disclosure, are to be considered within the scope of the disclosure claimed.

Before the present embodiments and methods for manufacturing and assembling the vinyl raised bed garden planter, it is to be understood that this disclosure is not limited to the particular configurations, process steps, and materials disclosed herein as such configurations, process steps, and materials may vary somewhat. It is also to be understood that the terminology employed herein is used for the purpose of describing particular embodiments only and is not intended to be limiting since the scope of the present disclosure will be limited only by the appended claims and equivalents thereof.

The publications and other reference materials referred to herein to describe the background of the disclosure, and to provide additional detail regarding its practice, are hereby incorporated by reference herein in their entireties, with the following exception: In the event that any portion of said reference materials is inconsistent with this application, this application supercedes said reference materials. The reference materials discussed herein are provided solely for their disclosure prior to the filing date of the present application. Nothing herein is to be construed as a suggestion or admission that the inventor is not entitled to antedate such disclosure by virtue of prior disclosure, or to distinguish the present disclosure from the subject matter disclosed in the reference materials.

It must be noted that, as used in this specification and the appended claims, the singular forms "a," "an," and "the" include plural referents unless the context clearly dictates otherwise.

In describing and claiming the present disclosure, the following terminology will be used in accordance with the definitions set out below.

As used herein, the terms "comprising," "including," "containing," "characterized by," and grammatical equivalents thereof are inclusive or open-ended terms that do not exclude additional, unrecited elements or method steps.

As used herein, the phrase "consisting of" and grammatical equivalents thereof exclude any element, step, or ingredient not specified in the claim.

As used herein, the phrase "consisting essentially of" and grammatical equivalents thereof limit the scope of a claim to the specified materials or steps and those that do not materially affect the basic and novel characteristic or characteristics of the claimed disclosure.

As used herein, the term "hollow" and grammatical equivalents thereof are defined to include any structure which is not solid or includes an enclosed or substantially enclosed space.

As used herein, the term "ground" and grammatical equivalents thereof are defined to include any environment, naturally existing or fabricated, which can provide a foundation or support for a structure, such as a raised garden box, for example.

Figure 1:
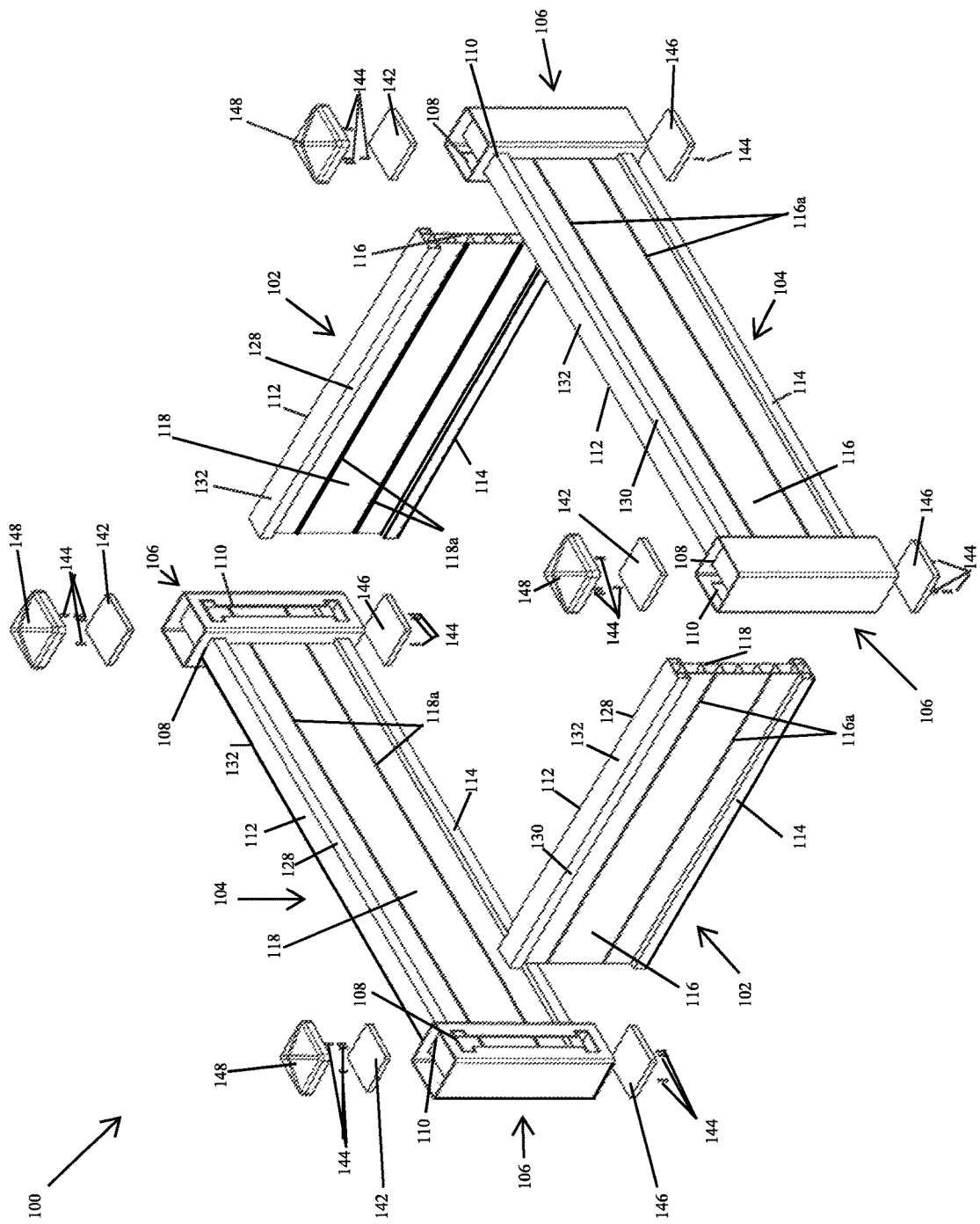
FIG. 1 is an exploded perspective view of a raised bed garden box assembly made in accordance with the principles of the present disclosure.
Figure 2:
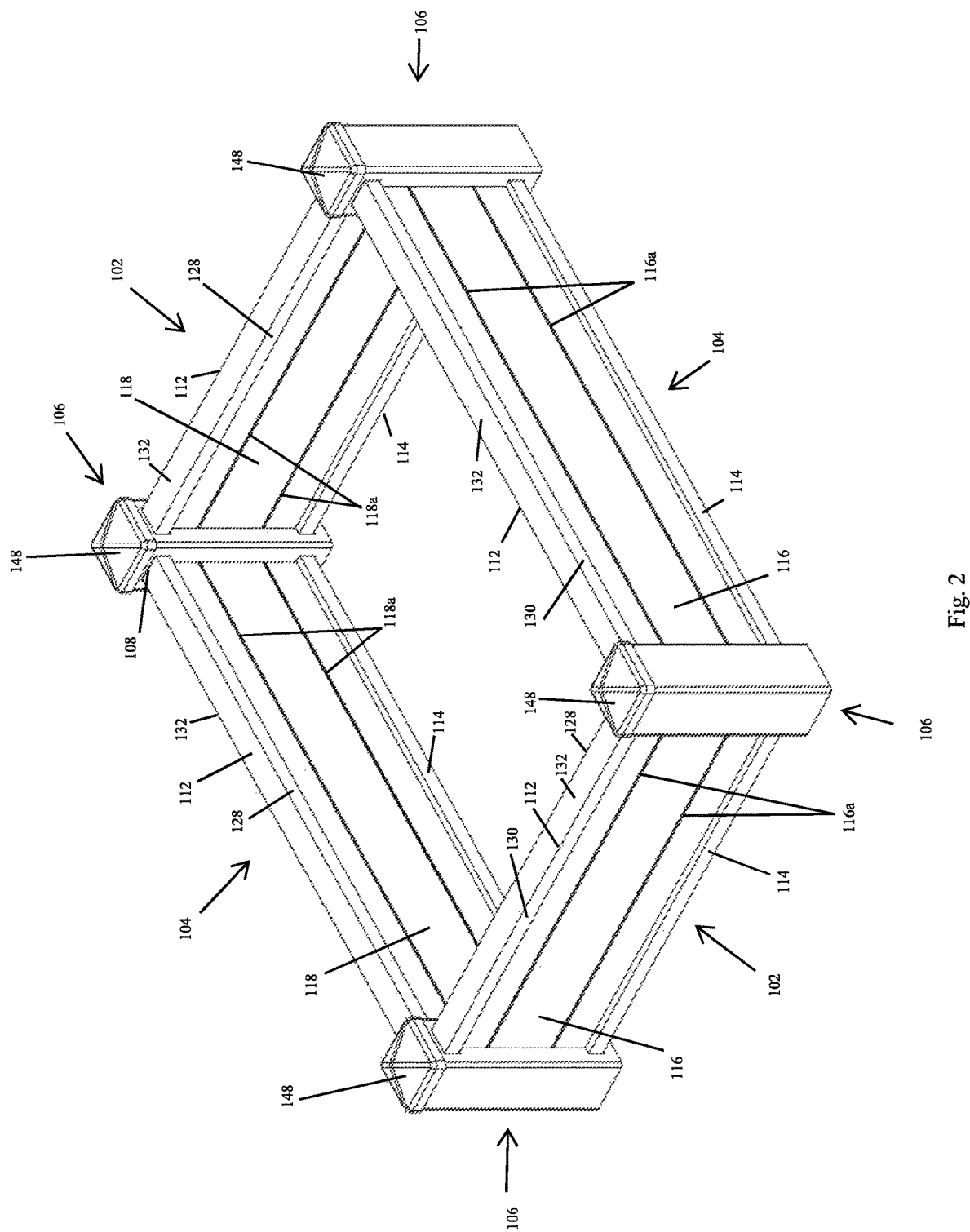
FIG. 2 is an assembled perspective view of the raised bed garden box assembly made in accordance FIG. 1.

Referring now to FIGS. 1-4c, there is shown an exploded, perspective view of the raised garden box assembly 100 of the current disclosure and a fully assembled perspective view. The raised garden box assembly 100 includes a plurality of side walls 102 and 104. In a first disclosed embodiment, as shown in FIGS. 1 and 2, the raised garden box assembly may include 4 side walls, including two pairs of opposing sidewalls 102 and 104. For example, two substantially identical sidewalls 102, may be position directly opposed to one another such that the opposing sidewalls 102 are substantially parallel with one another. Similarly, substantially identical sidewalls 104, may be positioned directly opposed to one another such that the opposing sidewalls 104 are substantially parallel with one another.

Each side wall 102 and 104 may be inserted into or received into a corner post 106, such that each terminating end of each sidewall 102 and 104 may be received into corresponding corner posts 106. Each corner post 106 includes a first opening 108 and a second opening 110. As shown in at least FIGS. 1, 2, 4a, 4b, 4c, 6 and 7, each corner post 106 may also include four sidewalls with each of the first opening 108 and the second opening 110 being through-holes that pass through at least one of the sidewalls of the corner post 106, such that openings 108 and 110 are through-holes passing through a sidewall and into an interior space of the hollow corner post 106. Each opening 108 and 110 may be formed on separate, distinct sides of the corresponding corner post 106. For example, the first opening 108 and the second opening 110 may be formed in perpendicular or substantially perpendicular surfaces of the corresponding corner post 106, such that when sidewall 102 is inserted into the first opening 108 and sidewall 104 is inserted into the second opening, sidewall 102 and sidewall 104 may extend away from the corresponding corner post 106 in perpendicular, or substantially perpendicular directions.

The raised garden box assembly 100 as shown in FIGS. 1 and 2, may include four corner posts 106 connecting four hollow sidewalls 102 and 104 (two sidewalls 102 and two sidewalls 104), to form a quadrilateral, such as a square or rectangle, for example, wherein the plurality of hollow sidewalls 102 and 104 collectively form a quadrilateral shape without vertices as shown in FIGS. 1 and 2, the hollow sidewalls 102 and 104 being spaced apart by the corner posts 106, the hollow sidewalls 102 and 104 thereby being prevented from forming a full quadrilateral. Each of the sidewalls 102 and 104 can be permanently or removable secured to corresponding corner post 106. Each of the corner post 106 may be configured to be partially buried in ground soil at a location desired for a raised garden box. Alternatively, the corner posts may also be configured to be set in concrete or other anchoring agent, or the corner post may be set on top of a ground surface, such as soil or other desired surface.

Each sidewall 102 and 104 may be formed as a hollow or substantially hollow structure, such that the sidewalls 102 and 104 are not solid structures. Each sidewall 102 and 106 may also be formed having a substantially I-shaped profile or cross-section. Each sidewall 102 and 104 may include a top rail 112 and a bottom rail 114. Each rail 112 and 114 connect and are integrally formed with an outer side member 116 and an inner side member 118 of each of the sidewalls 102 and 104. The terms "inner" and "outer" as used here, shall refer to opposing aspects of the same part or sub-part, such as the inner side member 118 and an outer side member 116 of each hollow sidewall 102 and 104, or inner walls and outer walls of the top rail and bottom rails 112 and 114, for example. The inner and outer side members 118 and 116 forming a hollow interior space.

The top rail 112 and the bottom rail 114 may have a greater width W1 than the width W2 between the inner side member 118 and outer side member 116, such that the top rail 112 may have an outer overhang 120 and an inner overhang 122, which may extend away from the outer side member 116 and the inner side member 118, respectively. Additionally, the outer overhang 120 and the inner overhang 120 may be coplanar or substantially coplanar with one another.

Similarly, the bottom rail 114 may have an outer overhang 124 and an inner overhang 126, which may extend away from the outer side member 116 and the inner side member 118, respectively. Additionally, the outer overhang 124 and the inner overhang 126 may be coplanar or substantially coplanar with one another. For example the width W1 of the top and bottom rails 112 and 114 may be 1 to 4 inches, or 2 inches, and the width between the outer side member 116 and the inner side member 118 may be 0.5 to 2 inches, or 1 inch.

Each of the top rail 112 and the bottom rail 114 are hollow or substantially hollow. The inner and outer overhangs 122 and 120, of the top rail 112, are connected to inner and outer rail walls 128 and 130, respectively, and the inner and outer rail walls 128 and 130 are connected to the top wall 132. The top, inner and outer walls 132, 128, and 130, and the inner and outer overhangs 122 and 120 substantially enclose the substantially hollow interior of the top rail.

The inner and outer overhangs 124 and 126, of the bottom rail 114 are connected to inner and outer rail walls 134 and 136, respectively, and the inner and outer rail walls 134 and 136 are connected to a bottom wall 138. The bottom, inner and outer walls 138, 134, and 136, and the inner and outer overhangs 126 and 124 substantially enclose the substantially hollow interior of the bottom rail 114.

Each side wall 102 and 104 also includes a plurality of support ribs 140. Support ribs 140 may be integrally formed between inner side member 118 and outer side member 116, with each rib 140 directly contacting or connected to the inner side member 118 and the outer side member 116, providing additional structural support against bending or breaking the sidewalls 102 and 104. Support ribs may also be integrally formed within the hollow interior of the top rail 112 and the bottom rail 114, with each top rail 112 having at least one support rib 140 directly contacting or connected to the top wall 132 and the inner overhang 122 and at least one support rib 140 directly contacting or connected to the top wall 132 and the outer overhang 120. And each bottom rail may include at least one support rib 140 directly contacting or connected to the bottom wall 138 and the inner overhang 126 and at least one support rib contacting or connected to the bottom wall 138 and the outer overhang 124.

Figure 5:
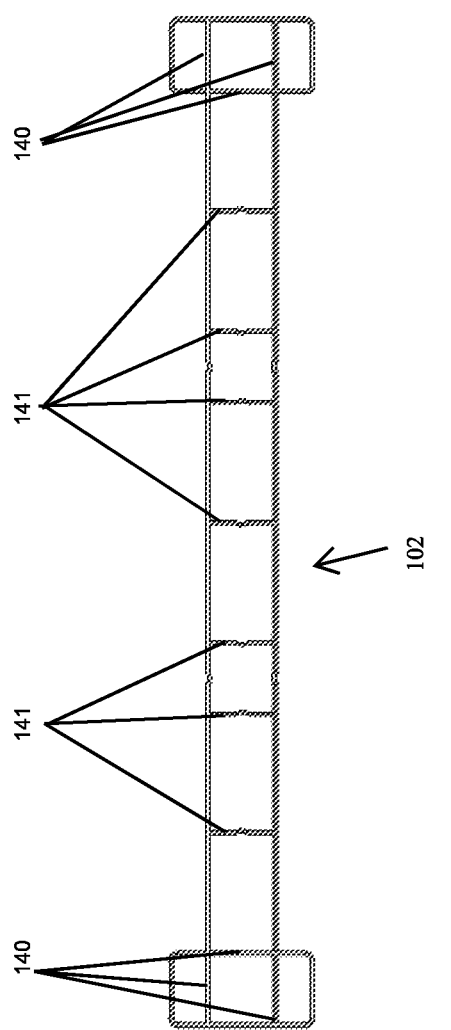
FIG. 5 is a side view of another hollow sidewall embodiment of a raised bed garden box assembly made in accordance with the principles of the present disclosure.
Figure 6:
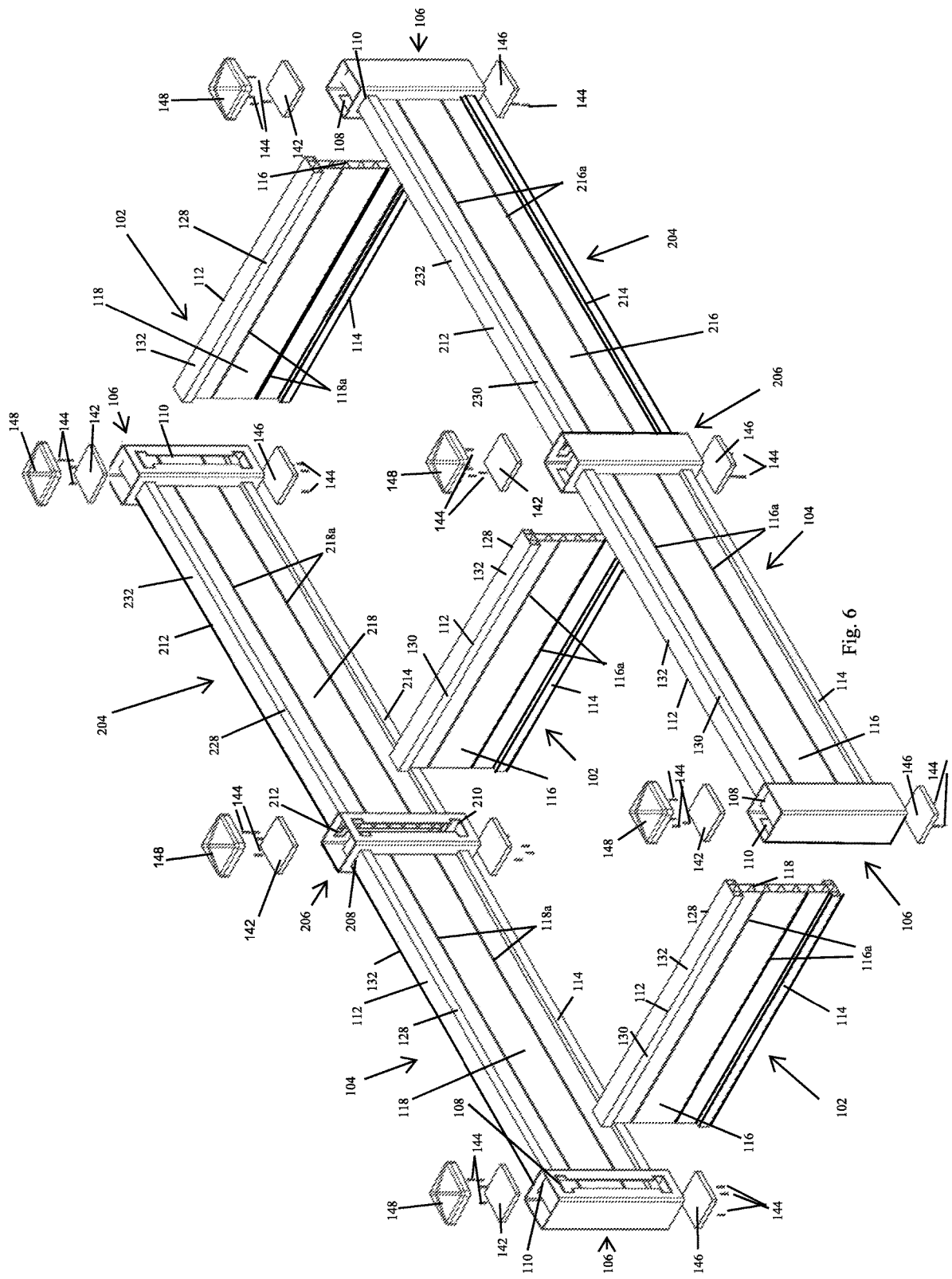
FIG. 6 is an exploded perspective view of another embodiment of a raised bed garden box assembly made in accordance with the principles of the present disclosure.
Figure 7:
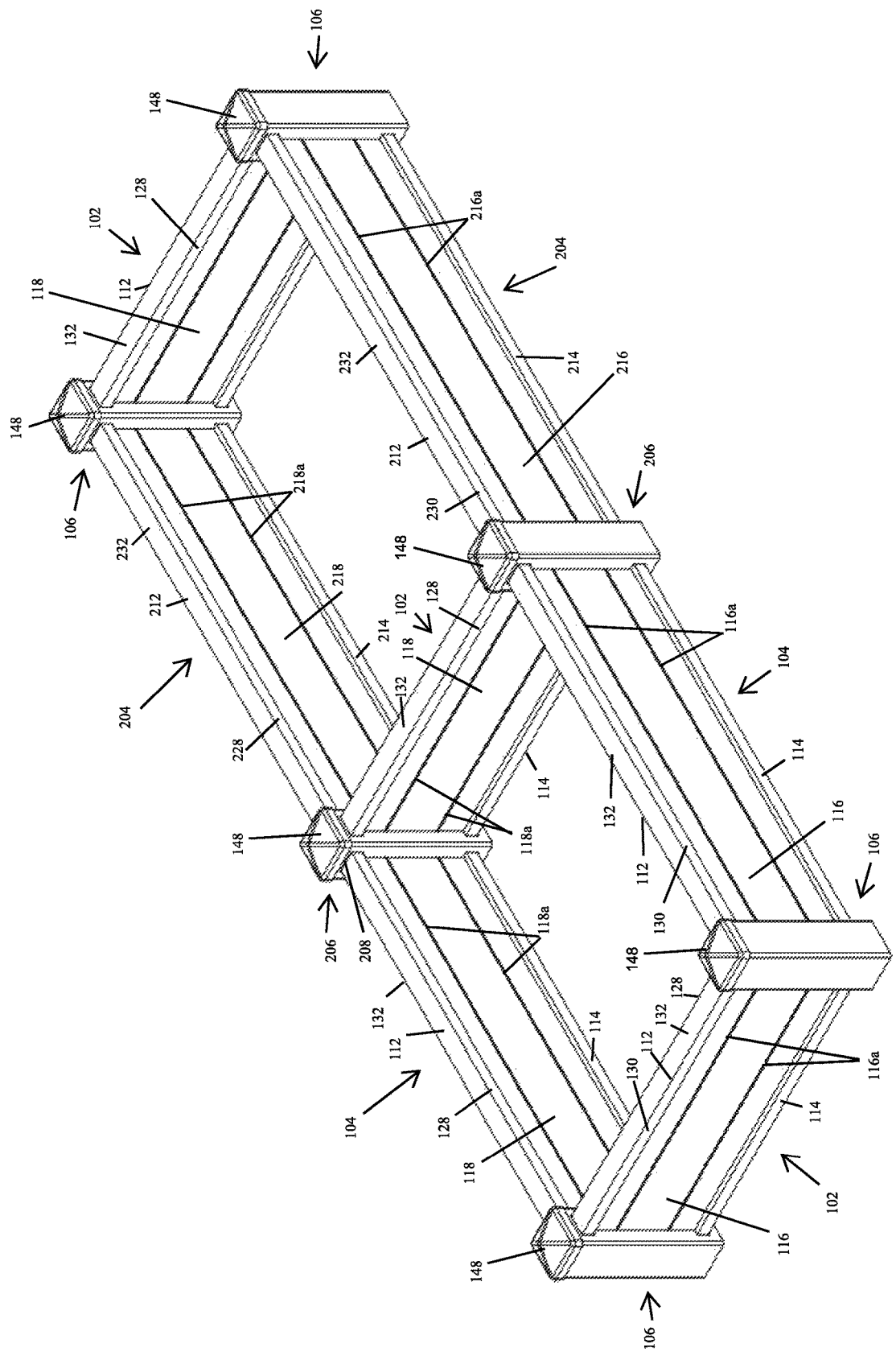
FIG. 7 is an assembled perspective view of the raised bed garden box assembly made in accordance FIG. 6.
Figure 8A:
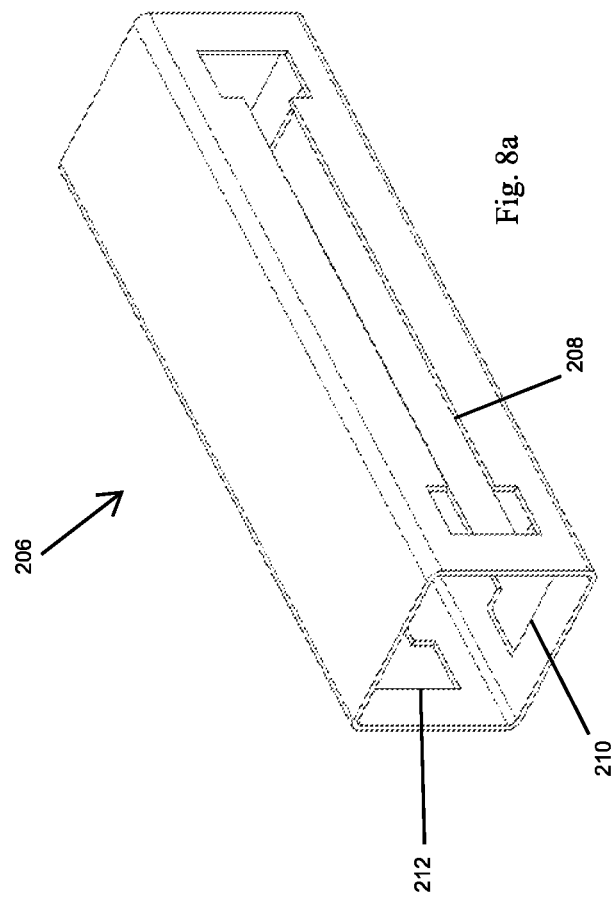
FIG. 8a is a perspective view of a corner post in accordance with the principles of the present disclosure.
Figure 8C:
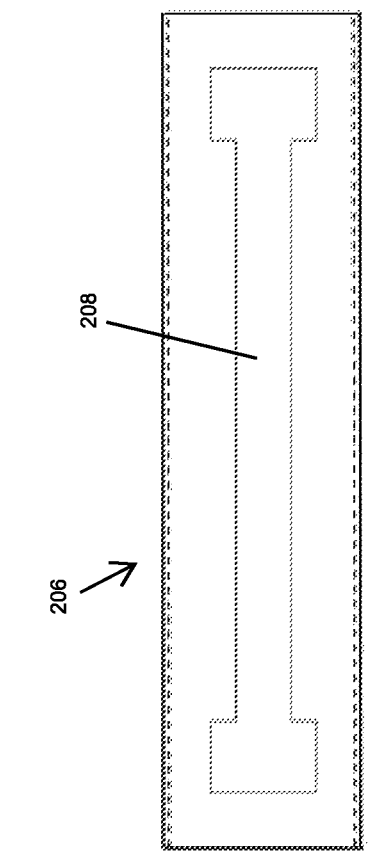
Figure 8B:
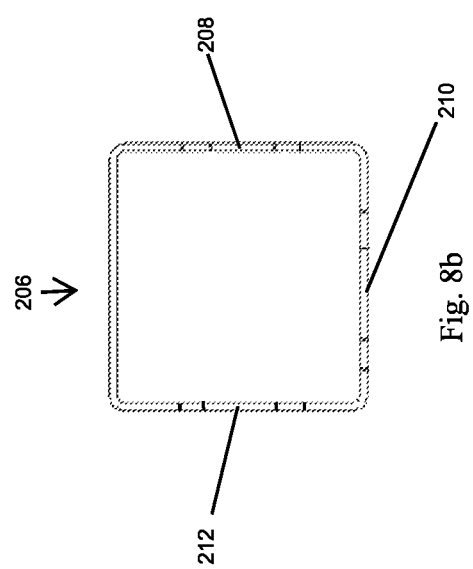

Each of the support ribs 140 may be planar or substantially planar. Alternatively, as shown in FIG. 5, support ribs 141 may have a wavy or non-planar shape. Each of the support ribs may also extend the entire length of the sidewall 102 or 104.

In each sidewall 102 and 104, may also include a support rib 140 that is formed within the interior of the top rail 112 or between the inner and outer side members 118 and 116, and is disposed between and aligned with the inner and outer overhangs 122 and 120. In each sidewall 102 and 104, may also include a support rib 140 that is formed within the interior of the top rail 112 or between the inner and outer side members 118 and 116, and may be coplanar or substantially coplanar with the inner and outer overhangs 122 and 120. This support rib 140 configuration greatly increase the bending and torsional strength between the top rail 112 and inner and outer side members 118 and 116.

In each sidewall 102 and 104, may also include a support rib 140 that is formed within the interior of the bottom rail 114 or between the inner and outer side members 118 and 116, and is disposed between and aligned with the inner and outer overhangs 126 and 124. In each sidewall 102 and 104, may also include a support rib 140 that is formed within the interior of the bottom rail 114 or between the inner and outer side members 118 and 116, and may be coplanar or substantially coplanar with the inner and outer overhangs 126 and 124. This support rib 140 configuration greatly increases the bending and torsional strength between the bottom rail 114 and inner and outer side members 118 and 116.

Each sidewall 102 and 104 may also include at least one outer side member channel 116a or a plurality of outer side member channels 116a. Each sidewall 102 and 104 may also include at least one inner side member channel 118a or a plurality of inner side member channels 118a. Each outer and inner side member channel 116a and 118a may extend the entire length of the corresponding sidewall 102 or 104 and may be parallel or substantially parallel with the top and bottom walls 132 and 138. Each outer and inner side member channel 116a and 118a may be formed as an integral part of the respective outer or inner side member 116 and 118 and may have a curved, rounded, squared or other desired cross-sectional shape.

Each outer side member channel 116a formed on the outer side member 116 may be symmetrically spaced, uniformly spaced, or asymmetrically spaced from one another depending on the desired physical or aesthetic effect. Each inner side member channel 118a formed on the inner side member 118 may also be symmetrically spaced, uniformly spaced, or asymmetrically spaced from one another depending on the desired physical or aesthetic effect.

To assemble the raised garden box assembly 100 each sidewall 102 and 104 may be inserted into a corresponding opening 108 or 110 in a corner post 106. Each opening 108 and 110 may be formed having a nearly identical profile as the I-shaped cross-section of the sidewalls 102 and 104, such that a user can slide a terminating end of the sidewall 102 or 104 into the opening 108 or 110 with little space between sidewall 102 or 104 and the perimeter of the corresponding opening 108 or 110.

Once each of the sidewalls 102 and 104 are inserted into corresponding corner posts 106, the sidewalls 102 and 104 and corner posts 106 may form a quadrilateral, rectangular or square shape raised garden box interior space or enclosure. After each of the sidewalls 102 and 104 are inserted into corresponding corner posts 106, a top support member 142 may be inserted into the top of each corner post 106 and secured to the corresponding sidewall 102 or 104 within the corner post 106. The top support member 142 may be permanently secured to the corresponding sidewall 102 or 104 or removable secured thereto. For example, the top support member may be secured using fasteners 144, such as screws bolts or nails, or adhesive or any other desired fastening mechanism. The top support member 142 may have a similar cross-sectional shape (for example, a square or quadrilateral shape, or any other desired shape) as the interior cross-section of the hollow interior space of the corner post 106, such that once inserted into the top of the corner post 106 and secured to the corresponding sidewall 102 or 104, the top support member 142 will prevent any significant lateral movement of the secured sidewall 102 or 104 with respect to the corner post, thus provide a strong, secured engagement between the corner posts 106 and the corresponding sidewalls 102 and 104.

After each of the sidewalls 102 and 104 are inserted into corresponding corner posts 106, a bottom support member 146 may be inserted into the bottom of each corner post 106 and secured to the corresponding sidewall 102 or 104 within the corner post 106. The bottom support member 146 may be permanently secured to the corresponding sidewall 102 or 104 or removable secured thereto. For example, the bottom support member 146 may be secured using fasteners 144, such as screws bolts or nails, or adhesive or any other desired fastening mechanism. The bottom support member 146 may have a similar cross-sectional shape (for example, a square or quadrilateral shape, or any other desired shape) as the interior cross-section hollow interior space of the corner post 106, such that once inserted into the top of the corner post 106 and secured to the corresponding sidewall 102 or 104, the bottom support member 146 will prevent any significant lateral movement of the secured sidewall 102 or 104 with respect to the corner post, thus provide a strong, secured engagement between the corner posts 106 and the corresponding sidewalls 102 and 104.

It is to be understood that the terms "top support member" and "bottom support member," as used herein, shall be construed broadly to cover any suitable structural support member, such as a cap, reinforcement plate, strut, brace, flange or other suitable structural support member. Accordingly, the top support member 142 could be a reinforcement plate, strut, brace, flange or any other suitable structural support member, as could the bottom support member 146.

The final step of assembling the raised garden box assembly 100 is attaching enclosure caps 148 to the top of each corner post 106. The enclosure caps 148 are designed and configured to enclose and substantially seal the hollow interior space of each corner post 106 and provide a desired aesthetic effect. Each enclosure cap 148 may be configured to be secured to the top of a corresponding corner post via a snap-fit engagement, slip engagement, friction fit, or secured by means of suitable adhesive, although any desired securement mechanism could be used, including screws, nails, bolts, adhesive or welds.

Each component of the disclosed raised garden box assembly 100 may be fabricated from extruded polyvinyl chloride ("pvc"), plastic, vinyl, resin, wood, metal, polymer or any other desired material. Each sidewall may be fabricated from pvc, vinyl, plastic or other desired material, as a single, unitary piece, using an extrusion process. Using an extrusion manufacturing process, each components of the disclosed sidewalls 102 and 104, including the top rail 112, bottom rail 114, outer side member 116, inner side member 118 and the plurality of support ribs 140 may all be integrally formed as a single unitary piece. As a singularly extruded piece, sidewalls 102 and 104 have superior strength when compared with welded, glued or otherwise fastened, multi-component sidewalls.

Additionally, the disclosed single, unitary piece, sidewalls 102 and 104, significantly reduce labor costs and assembly time, since there are no components that must be fastened or adhered together. Significant manufacturing time and costs are also saved by reducing the number of cuts that need to be made per sidewall. For example, after extruding a single piece sidewall, a single cut (to the desired sidewall length) per sidewall is all the cutting and preparation that is necessary after the extrusion process. For example, the sidewalls 102 and 104 may be cut to various desired lengths, such as 3', 4', 8', 10', 12' or any other desired lengths. As another example, sidewalls 102 and 104 can also be formed of any desired height, such as 6"-18", 10"-14", 10", 12" or any other desired height.

Another embodiment of the disclosed raised garden box assembly 200 is shown in FIGS. 6-8c. Raised garden box 200 includes many of the same components of the earlier disclosed raised garde box 100, and these common components are shown in FIGS. 1-4c having the same corresponding reference numerals as those described in reference to raised garden box 100. For example, raised garden box 200 may include the four corner posts 106 connecting five sidewalls 102 and 104 (three sidewalls 102 and two sidewalls 104), to form a bifurcated quadrilateral, such as a bifurcated square or rectangle, for example.

Raised garden box 200 includes a extension capability by adding two additional sidewalls 204, one additional side wall 102 bifurcating the raised garden box 200 interior space, or enclosure, and two T-posts 206. The two T-posts can be used in between or intermediate to the corner posts 106 to extend the overall length of the raised garden box 200. Additionally, an intermediate sidewall 102 can also be connected to, interposed between, or inserted into the T-posts 206 as a means of bifurcating the interior space, or enclosure, of the raised garden box 200. Additional alternative embodiments of the raised garden box may still include T-posts 206, as disclosed, yet omit the additional sidewall 102 bifurcating the interior space of the raised garden box 200, thus simply creating a raised garden be having an increased interior space.

Each of the sidewalls 204 (as with sidewalls 204) can be permanently or removable secured to corresponding corner posts 106 and T-posts 206. Each of the T-post 206 may be configured to be partially buried in ground soil at a location desired for a raised garden box. Alternatively, the T-post 206 posts may also be configured to be set in concrete or other anchoring agent, or the corner post may be set on top of a ground surface, such as soil or other desired surface.

Each sidewall 204 may be formed as a hollow or substantially hollow structure, such that the sidewalls 204 are not solid structures. Each sidewall 204 may also be formed having a substantially I-shaped profile or cross-section. Each sidewall 204 may include a top rail 212 and a bottom rail 214. Each top rail 212 and bottom rail 214 connect and are integrally formed with an outer side member 216 and an inner side member 218 of each of the sidewalls 204.

The top rail 212 and the bottom rail 214 may have a greater width W1 than the width W2 between the inner side member 218 and outer side member 216, such that the top rail 212 may have an outer overhang 220 and an inner overhang 222, which may extend away from the outer side member 216 and the inner side member 218, respectively. Additionally, the outer overhang 220 and the inner overhang 220 may be, aligned, coplanar or substantially coplanar with one another.

Each side wall 204 also includes a plurality of support ribs 140, in the same manner as sidewalls 102 and 104. Support ribs 140 may be integrally formed between inner side member 218 and outer side member 216, with each rib 140 directly contacting or connected to the inner side member 218 and the outer side member 216, providing additional structural support against bending or breaking the sidewalls 204. Support ribs 140 may also be integrally formed within the hollow interior of the top rail 212 and the bottom rail 214, with each top rail 212 having at least one support rib 140 directly contacting or connected to the top wall 232 and the inner overhang 222 and at least one support rib 140 directly contacting or connected to the top wall 232 and the outer overhang 220. And each bottom rail may include at least one support rib 140 directly contacting or connected to the bottom wall 238 and the inner overhang 226 and at least one support rib contacting or connected to the bottom wall 238 and the outer overhang 224.

To assemble the raised garden box assembly 200 each sidewall 102, 104 and 204 may be inserted into a corresponding opening 108 or 110 in a corner post 106, and or into a corresponding opening 208, 210, or 212 in a T-post. Each opening 108, 110, 208, 210 or 212 may be formed having a nearly identical profile as the I-shaped cross-section of the sidewalls 102, 104 and 204, such that a user can slide a terminating end of the sidewall 102, 104, or 204 into the opening 108, 110, 208, 210 or 212 with little space between sidewall 102, 104 or 204 and the perimeter of the corresponding opening 108, 110, 208, 210 or 212.

Once each of the sidewalls 102, 104, and 204 are inserted into corresponding corner posts 106 and/or T-posts 206, the sidewalls 102, 104, 204, corner posts 106 and T-posts 2206 may form a bifurcated quadrilateral, rectangular or square shape raised bed garden box. After each of the sidewalls 102, 104 and 204 are inserted into corresponding corner posts 106 and/or T-posts, the top support member 142 and enclosure caps 148 may be assembled in the same manner as described above with respect to raised bed garden box 100.

Additionally, the disclosed single, unitary piece, sidewalls 204, significantly reduce labor costs and assembly time, since there are no components that must be fastened or adhered together. Significant manufacturing time and costs are also saved by reducing the number of cuts that need to be made per sidewall. As another example, sidewalls 204 may be used as an optional extension (along with corresponding T-posts 206) to the disclosed raised garden box assembly 100 to increase the interior enclosed space of the raised bed garden box, as shown in assembly 200. For example, the sidewalls 206 may be cut to various desired lengths, such as 3', 4', 8', 10', 12' or any other desired lengths. As another example, sidewalls 206 can also be formed of any desired height, such as 6"-18", 10"-14", 10", 12" or any other desired height, similar to sidewalls 102 and 104.

Figure 10:
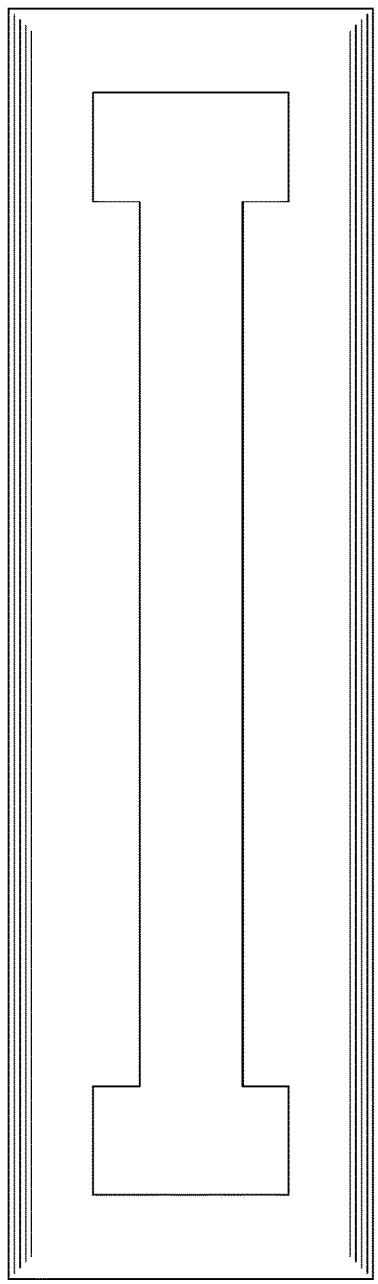
FIG. 10 is a right side view of the corner post of FIG. 9.
Figure 11:
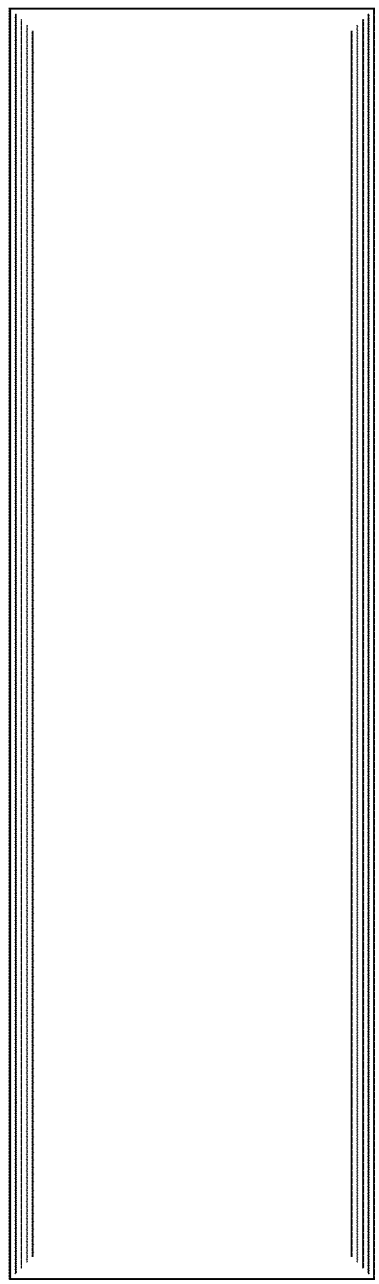
FIG. 11 is a left side view of the corner post of FIG. 9.
Figure 12:
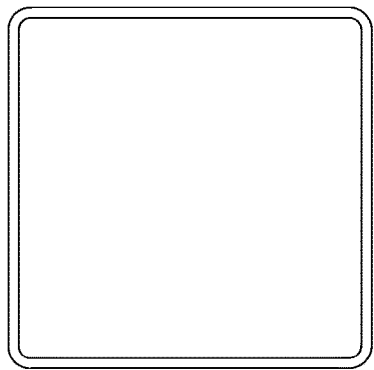
FIG. 12 is a top view of the corner post of FIG. 9.
Figure 13:
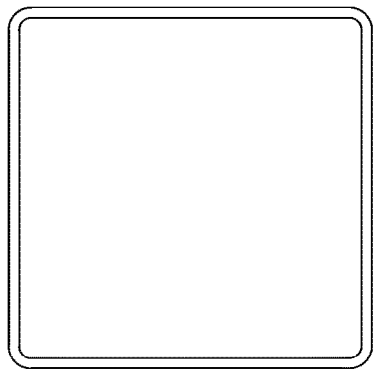
FIG. 13 is a bottom view of the corner post of FIG. 9.
Figure 14:
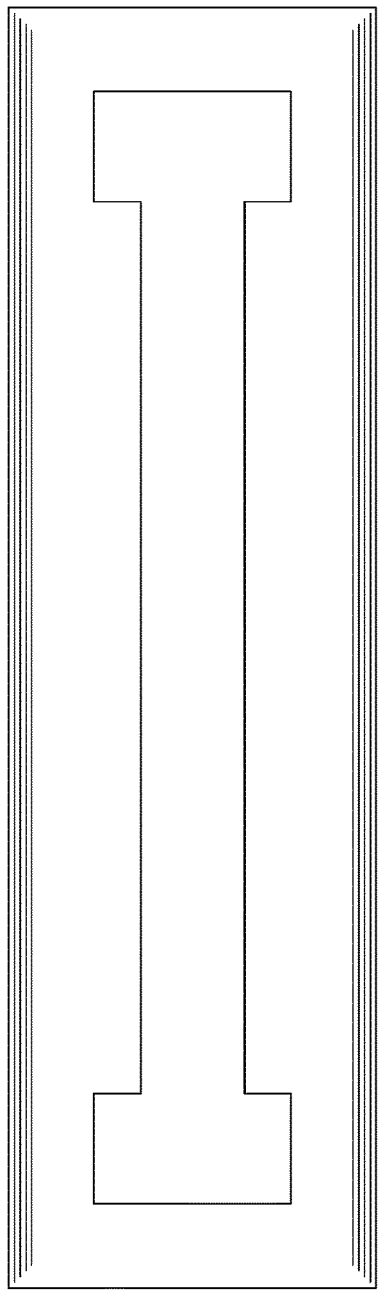
FIG. 14 is a front view of the corner post of FIG. 9.
Figure 15:
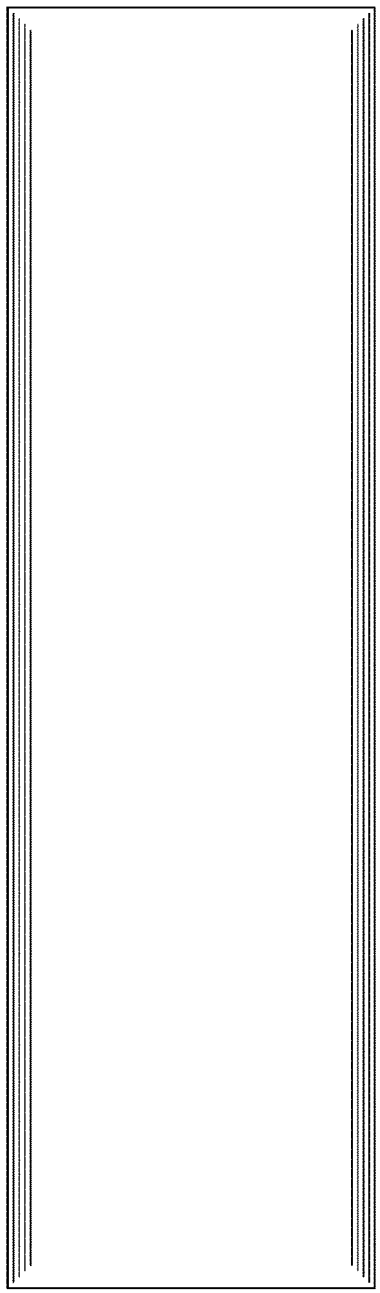
FIG. 15 is a rear view of the corner post of FIG. 9.
Figure 16:
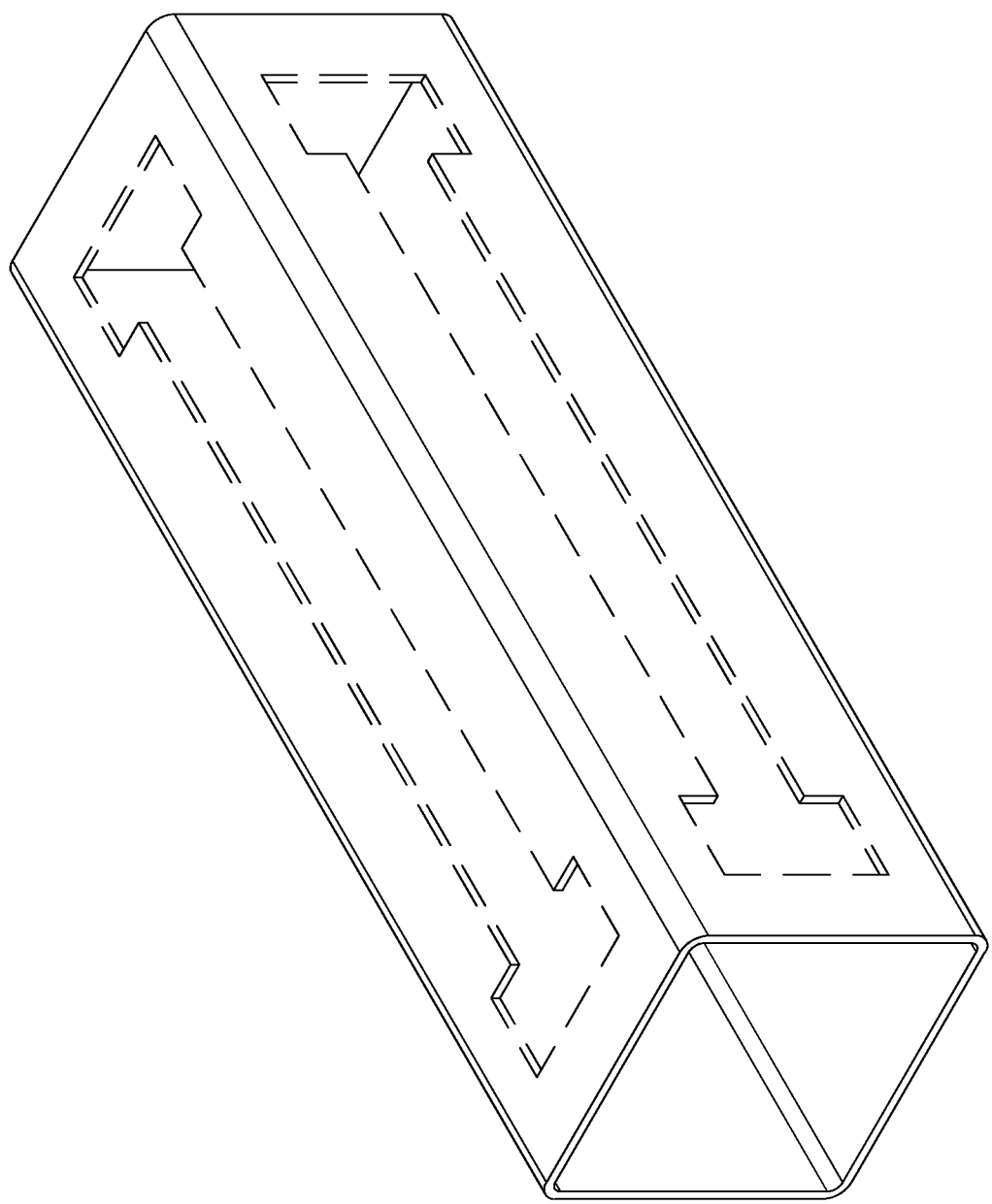
FIG. 16 is a first, alternative embodiment of the corner post of FIG. 9, made in accordance with the principles of the present disclosure and without limitation to any opening that could be formed therein.
Figure 17:
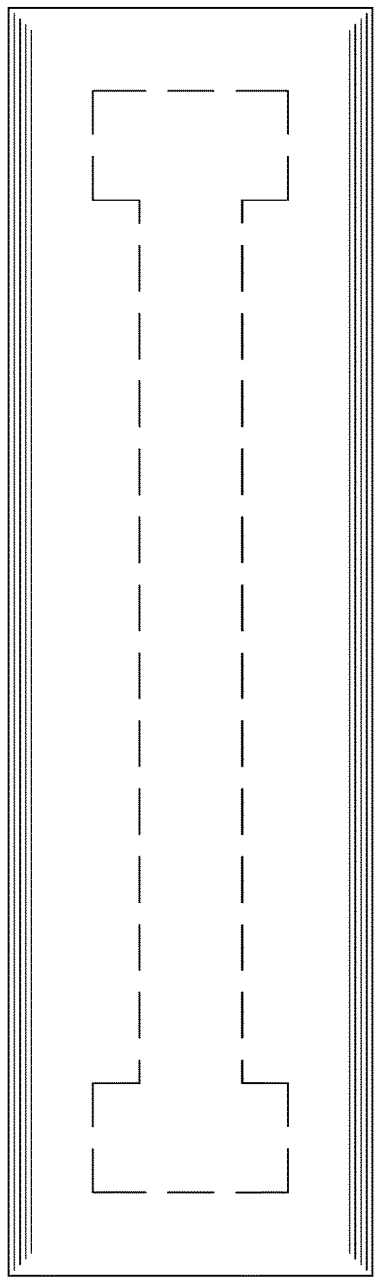
FIG. 17 is a right side view of the corner post of FIG. 16.
Figure 18:
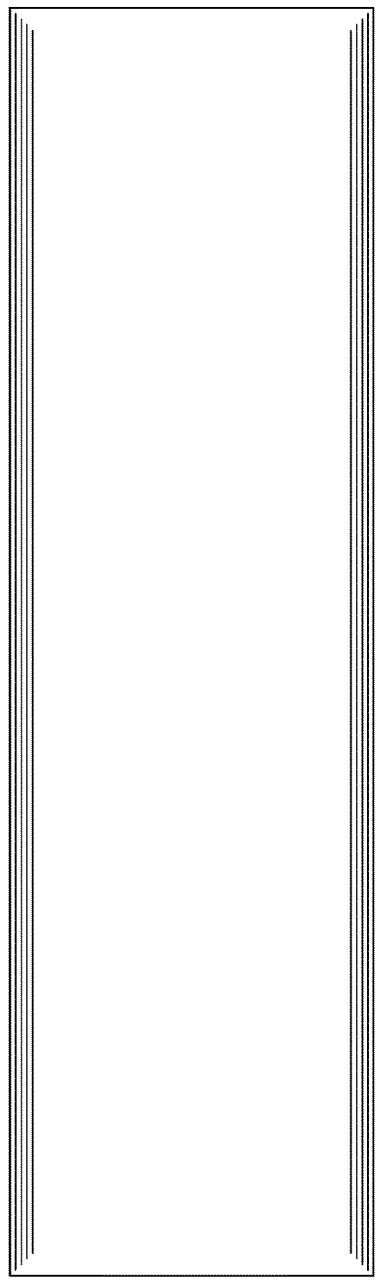
FIG. 18 is a left side view of the corner post of FIG. 16.
Figure 19:
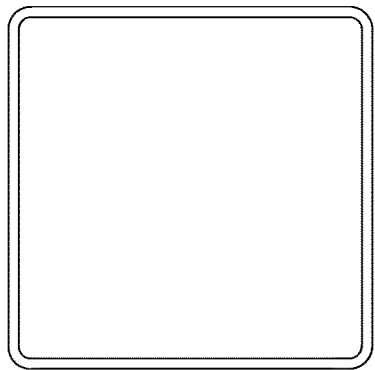
FIG. 19 is a top view of the corner post of FIG. 16.
Figure 20:
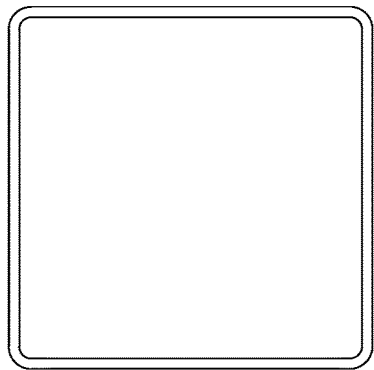
FIG. 20 is a bottom view of the corner post of FIG. 16.
Figure 21:
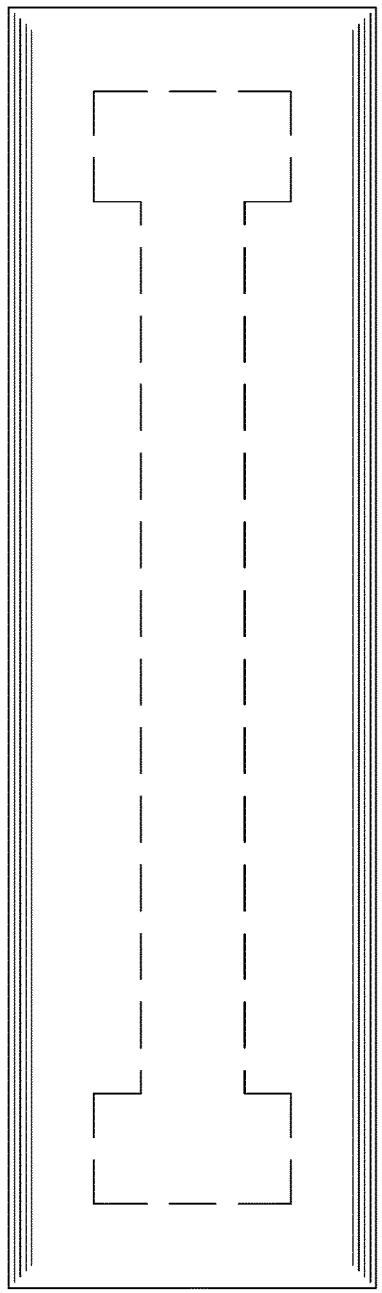
FIG. 21 is a front view of the corner post of FIG. 16.
Figure 22:
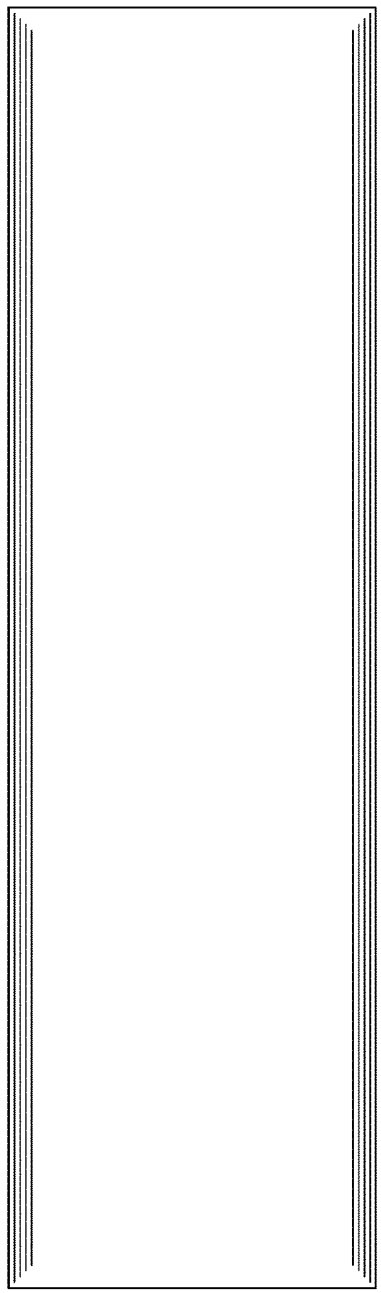
FIG. 22 is a rear view of the corner post of FIG. 16.
Figure 23:
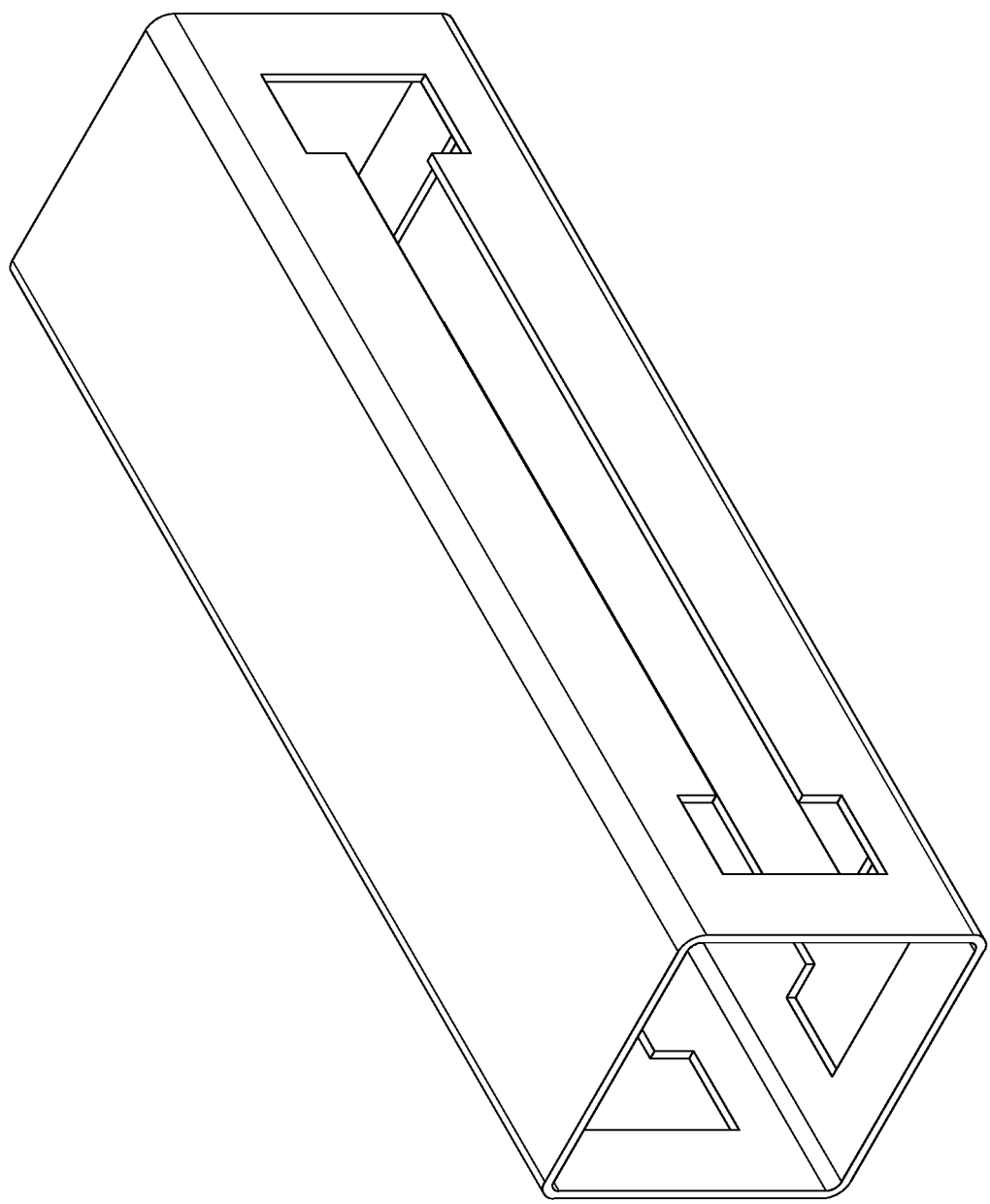
FIG. 23 is a perspective view of a T-post made in accordance with the principles of the present disclosure.
Figure 24:
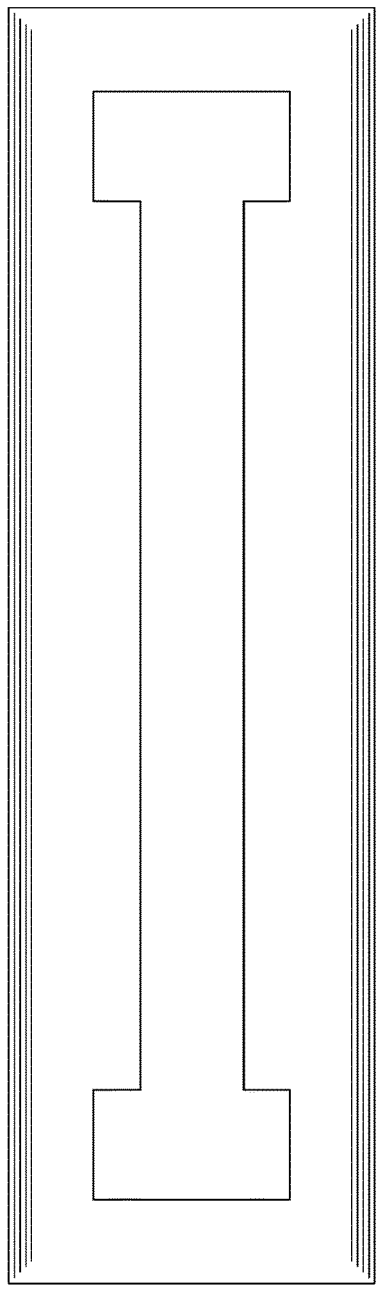
FIG. 24 is a right side view of the T-post of FIG. 23.
Figure 25:
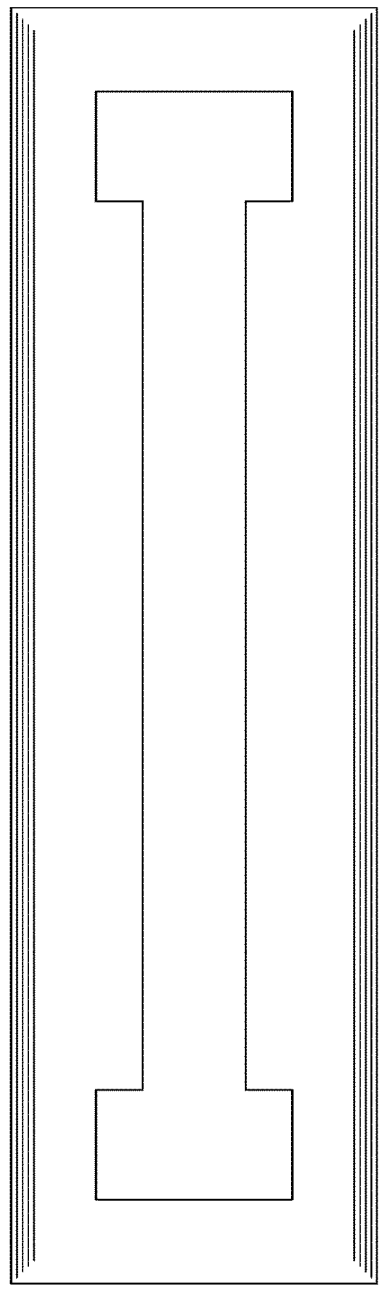
FIG. 25 is a left side view of the of the T-post of FIG. 23.
Figure 26:
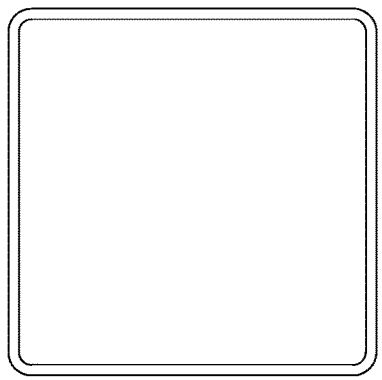
FIG. 26 is a top view of the of the T-post of FIG. 23.
Figure 27:
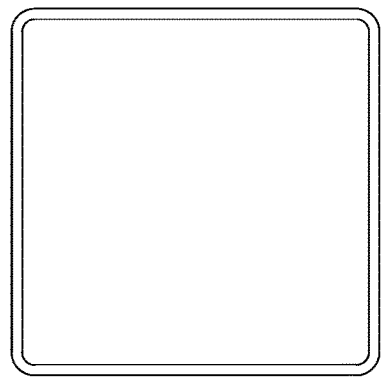
FIG. 27 is a bottom view of the of the T-post of FIG. 23.
Figure 28:
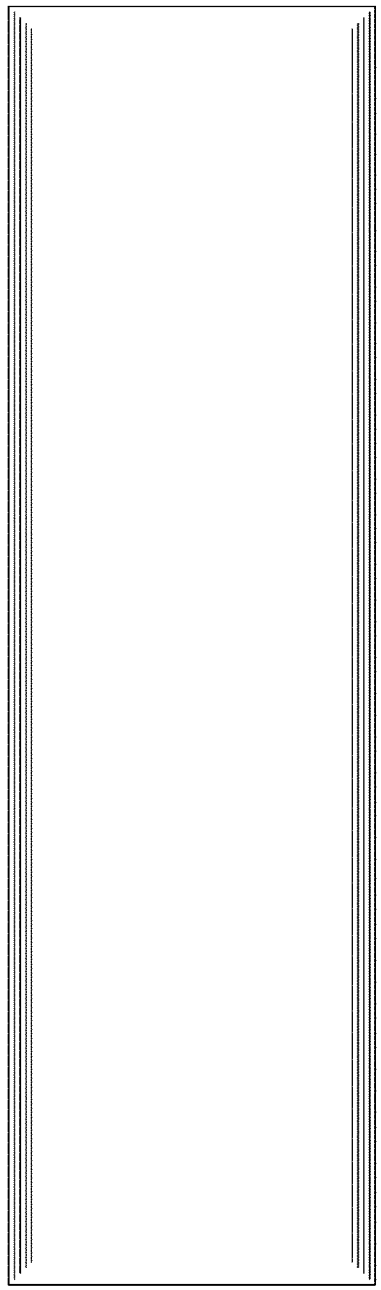
FIG. 28 is a front view of the of the T-post of FIG. 23.
Figure 29:
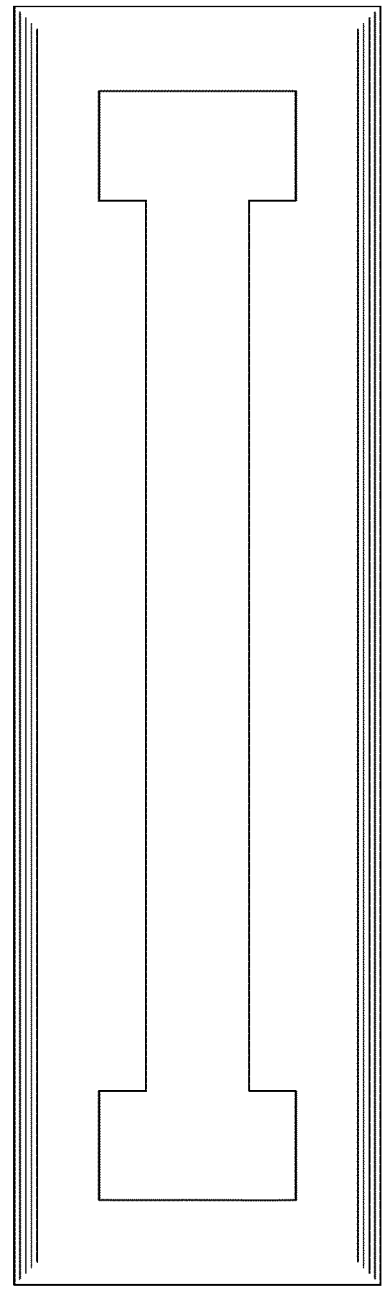
FIG. 29 is a rear view of the of the T-post of FIG. 23.
Figure 30:
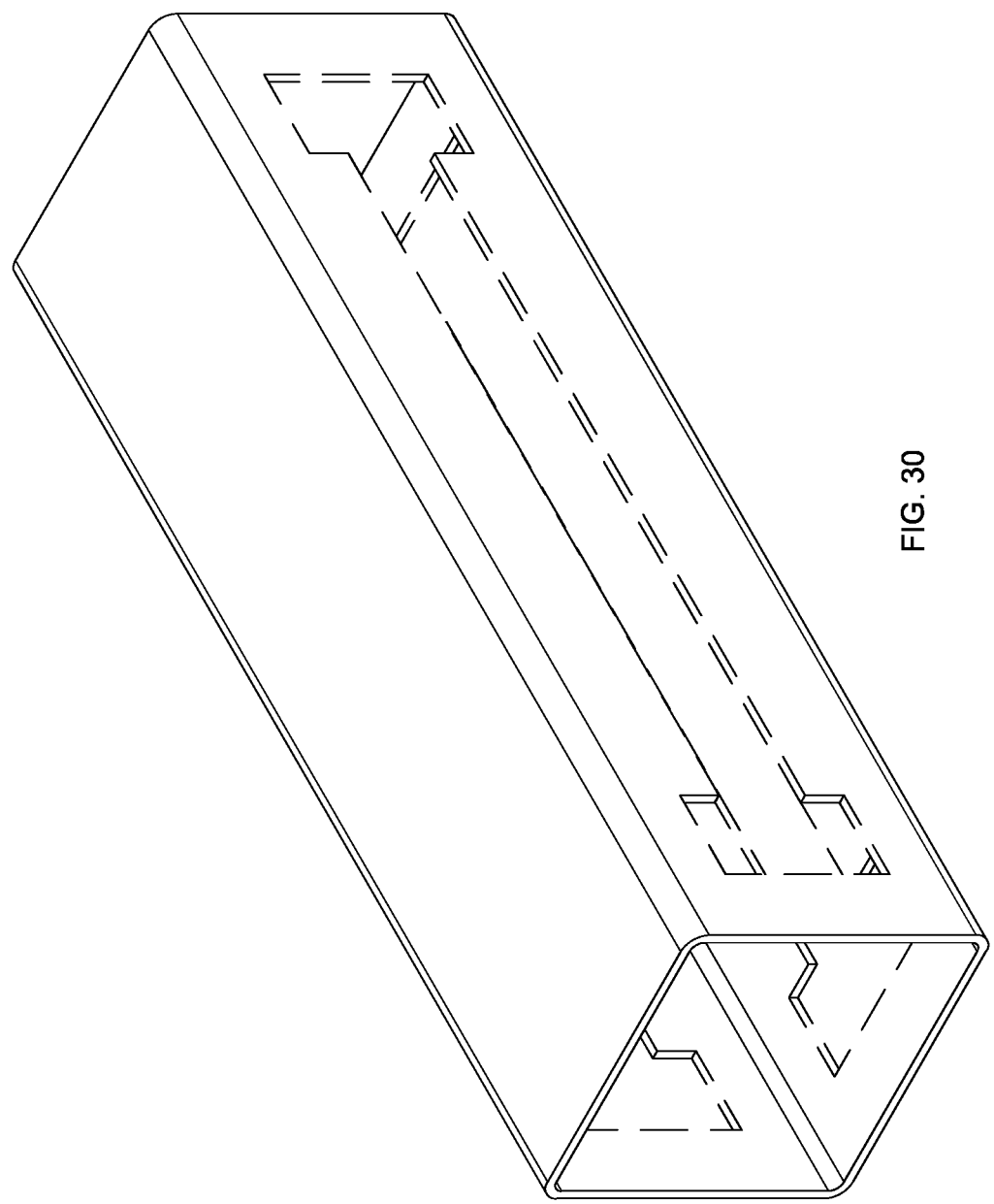
FIG. 30 is a first, alternative embodiment of the T-post of FIG. 23, made in accordance with the principles of the present disclosure and without limitation to any opening that could be formed therein.
Figure 31:
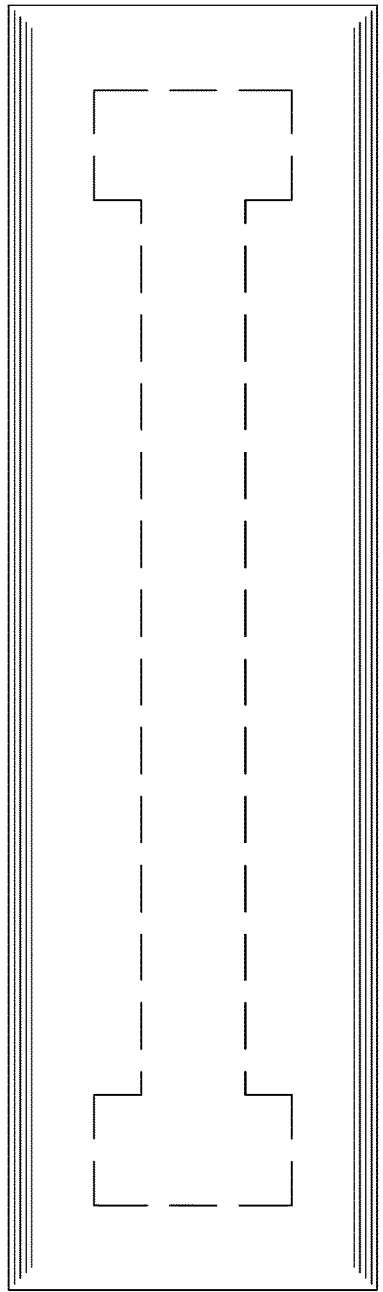
FIG. 31 is a right side view of the T-post of FIG. 30.
Figure 32:
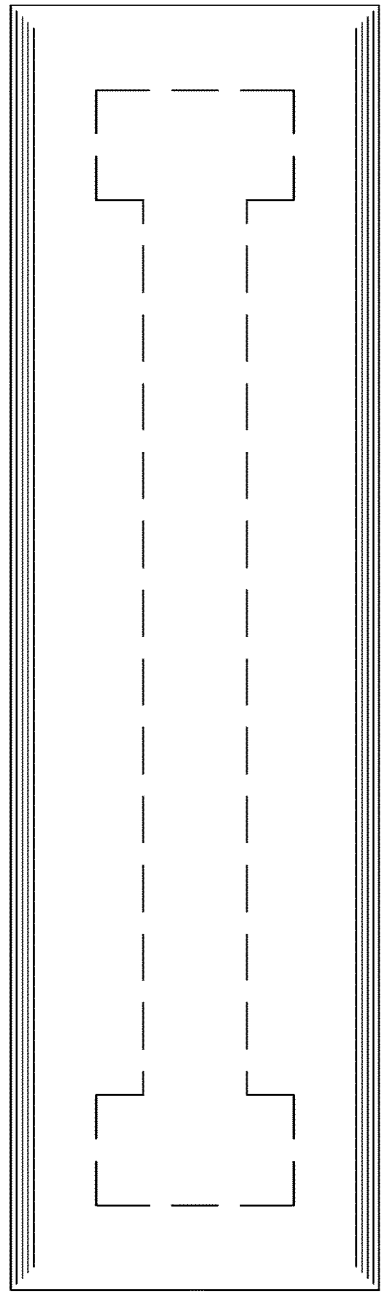
FIG. 32 is a left side view of the T-post of FIG. 30.
Figure 33:
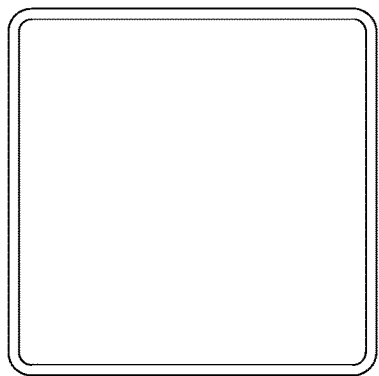
FIG. 33 is a top view of the T-post of FIG. 30.
Figure 34:
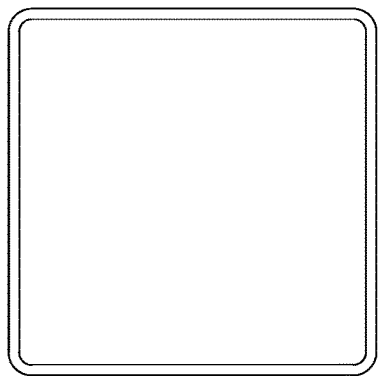
FIG. 34 is a bottom view of the T-post of FIG. 30.
Figure 35:
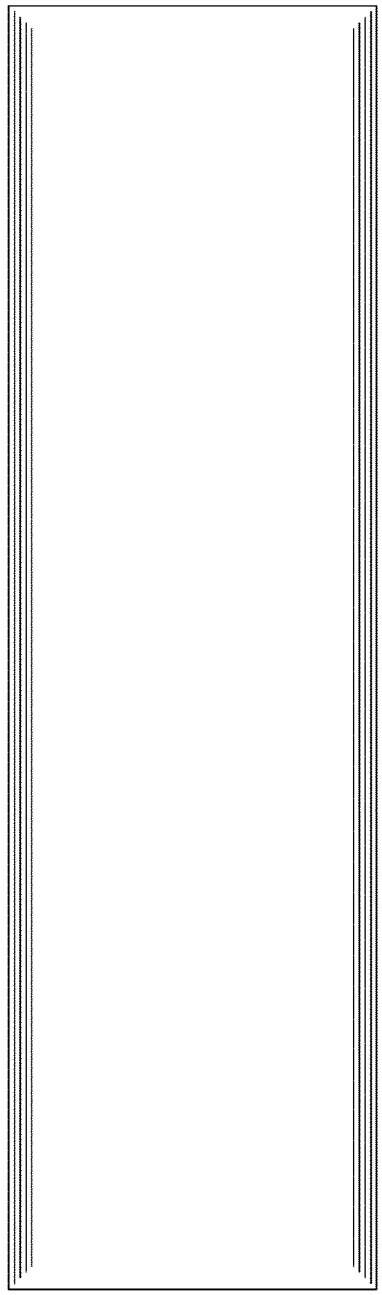
FIG. 35 is a front view of the T-post of FIG. 30.
Figure 36:
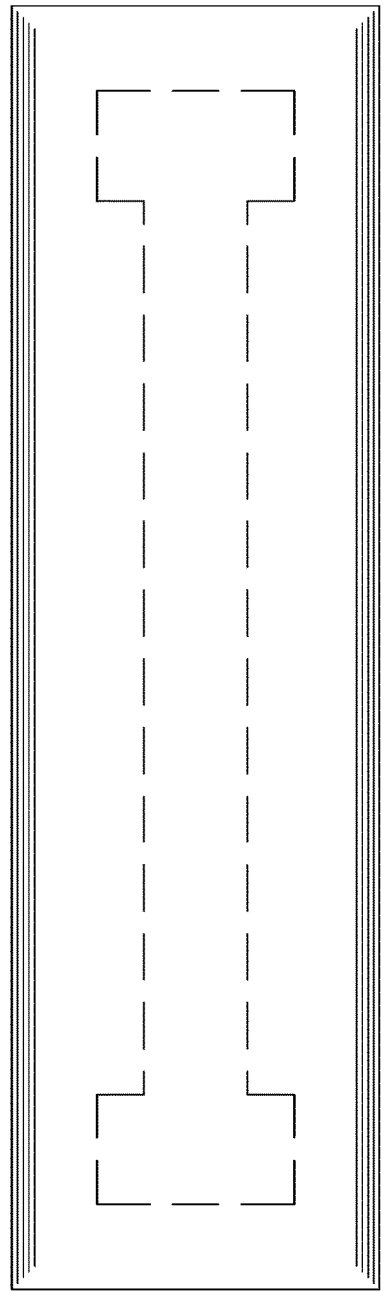
FIG. 36 is a rear view of the T-post of FIG. 30.
Figure 37:
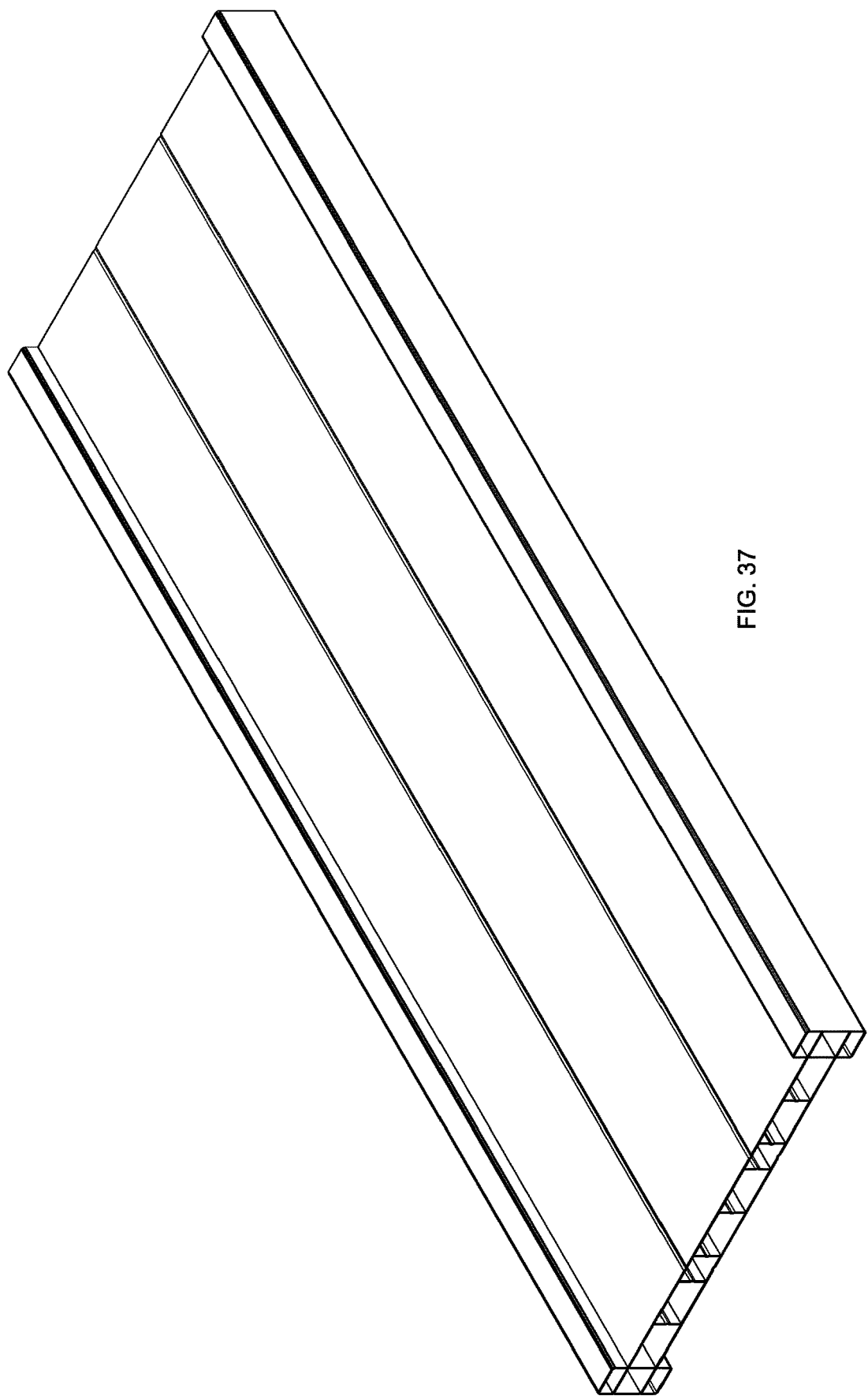
FIG. 37 is a perspective view of a sidewall made in accordance with the principles of the present disclosure.
Figure 38:
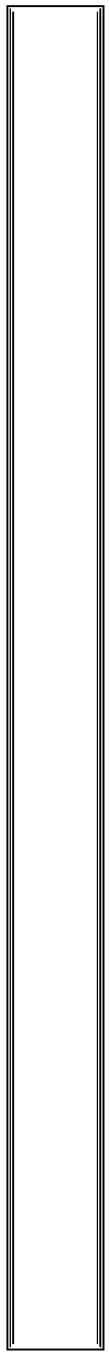
FIG. 38 is a top view of the sidewall of FIG. 37.
Figure 39:
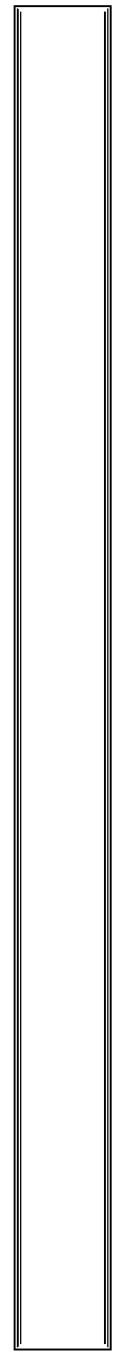
FIG. 39 is a bottom view of the sidewall of FIG. 37.
Figure 40:
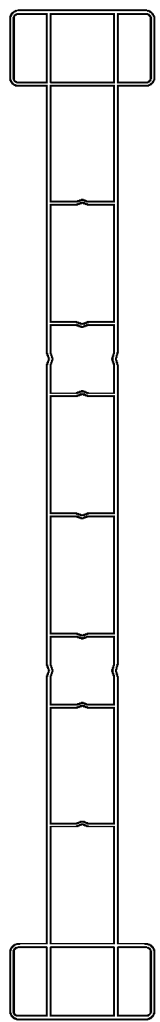
FIG. 40 is a front view of the sidewall of FIG. 37.
Figure 41:
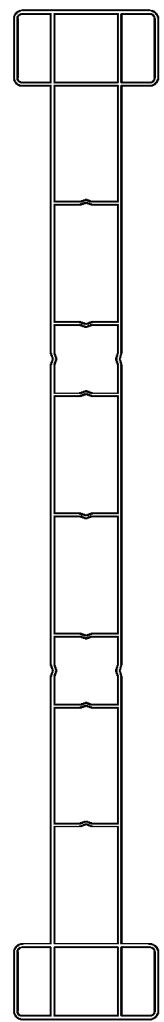
FIG. 41 is a rear view of the sidewall of FIG. 37.
Figure 42:
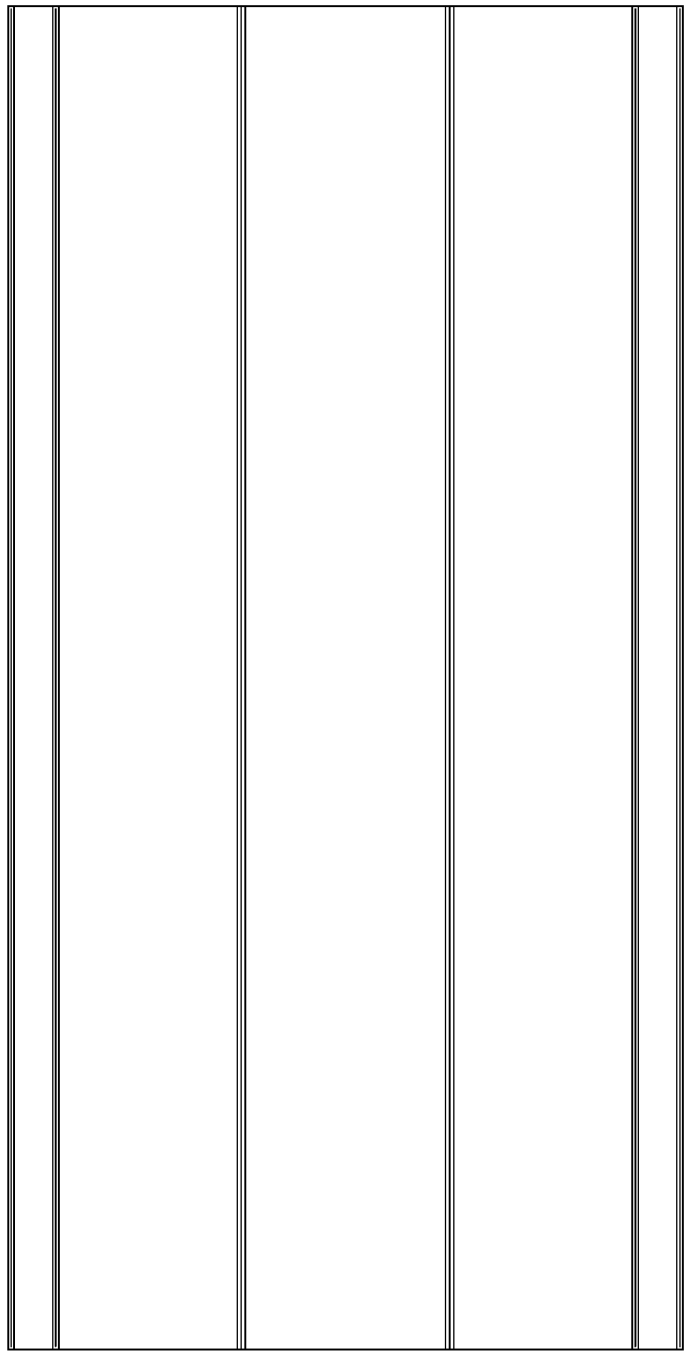
FIG. 42 is a right side view of the sidewall of FIG. 37.
Figure 43:
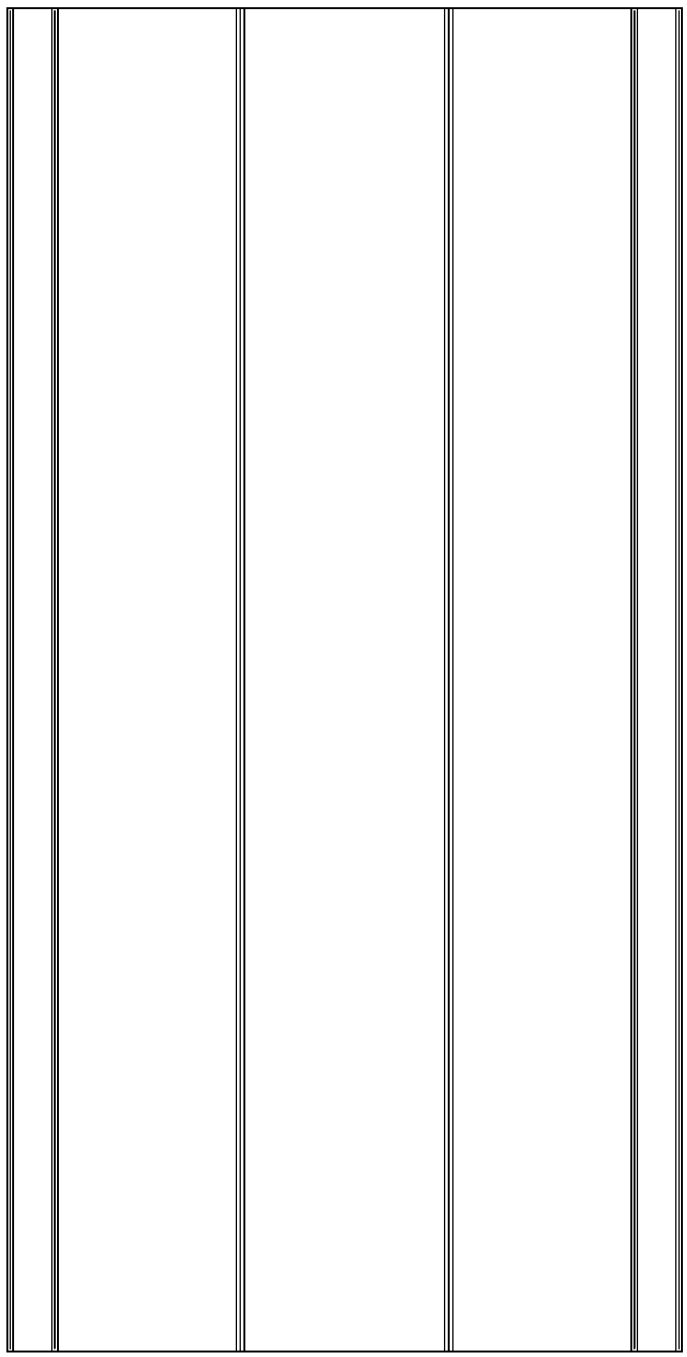
FIG. 43 is a left side view of the sidewall of FIG. 37.
Figure 44:
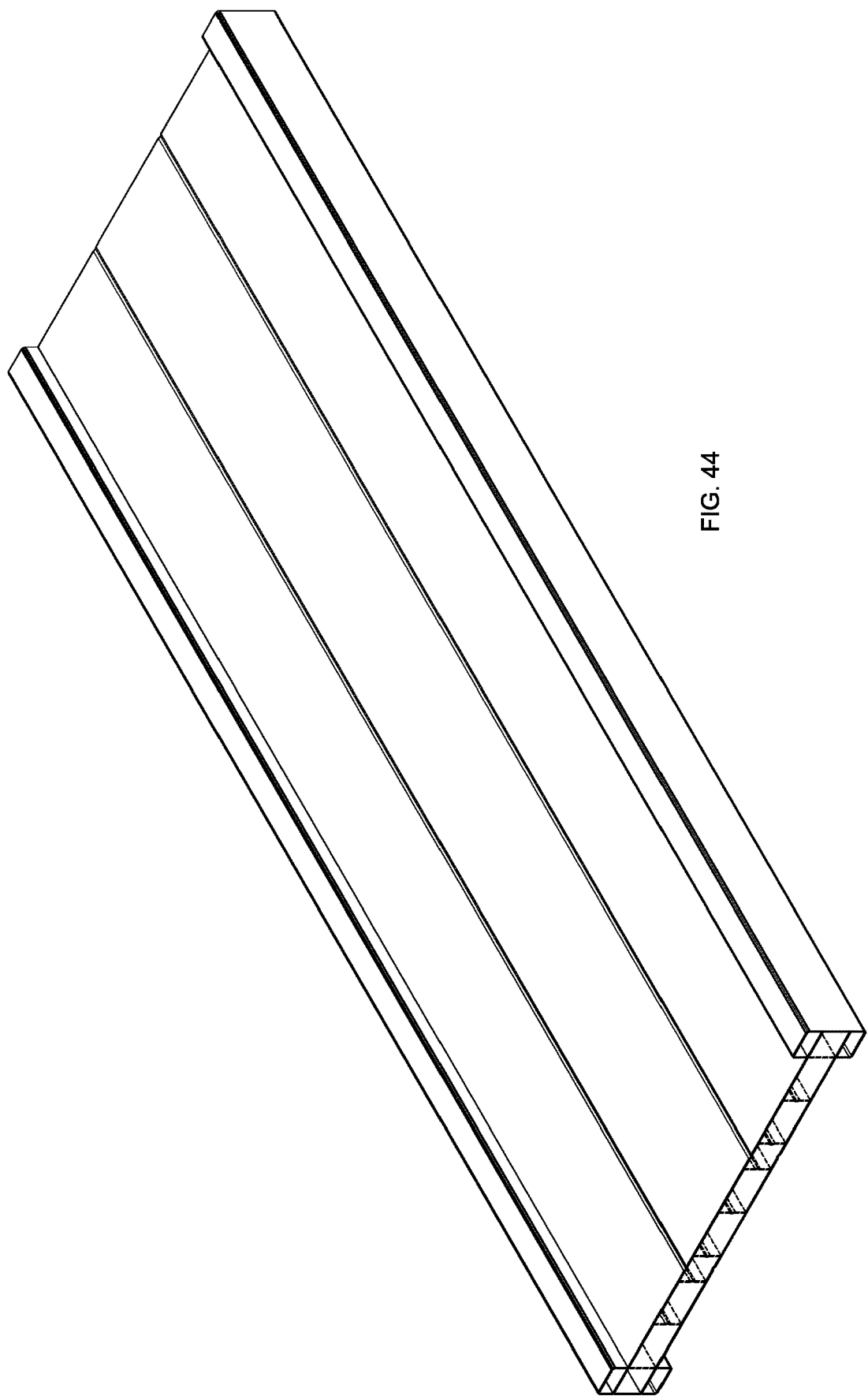
FIG. 44 is a first, alternative embodiment of the sidewall of FIG. 43, made in accordance with the principles of the present disclosure and without limitation to any support ribs that could be formed therein.
Figure 45:
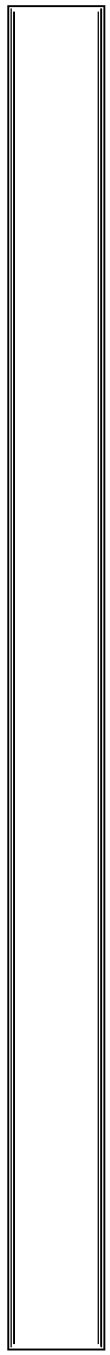
FIG. 45 is a top view of the sidewall of FIG. 44.
Figure 46:
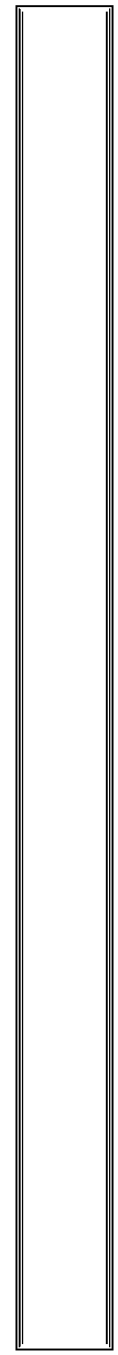
FIG. 46 is a bottom view of the sidewall of FIG. 44.
Figure 47:
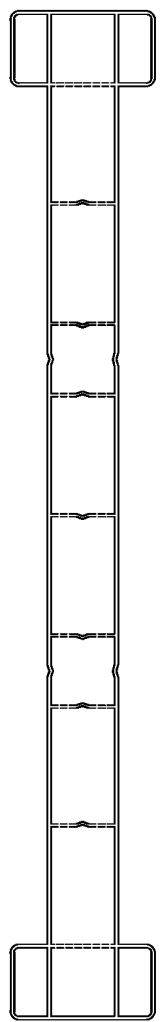
FIG. 47 is a front view of the sidewall of FIG. 44.
Figure 48:
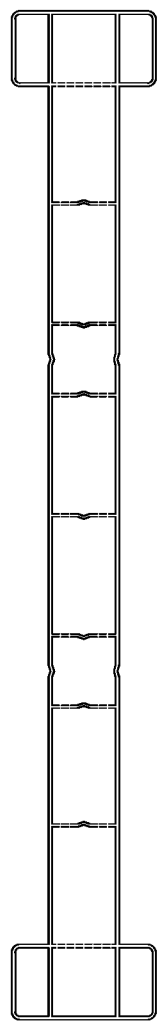
FIG. 48 is a rear view of the sidewall of FIG. 44.
Figure 49:
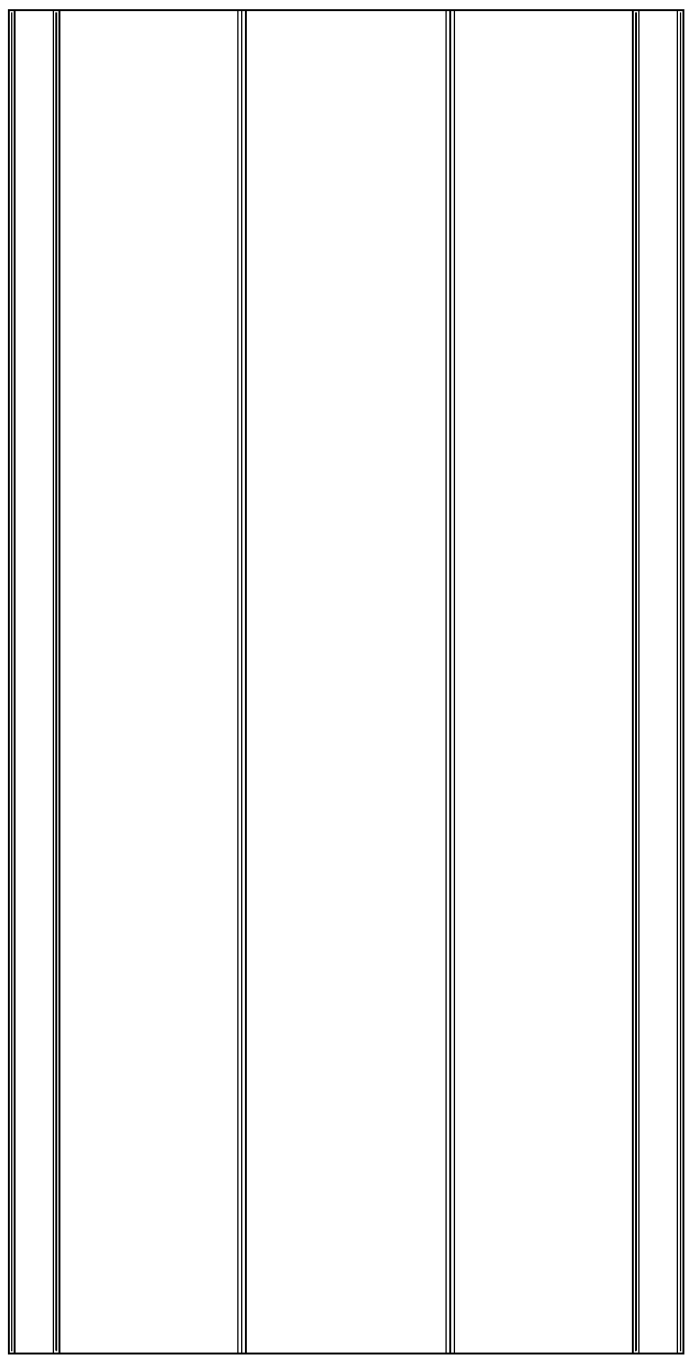
FIG. 49 is a right side view of the sidewall of FIG. 44.
Figure 50:
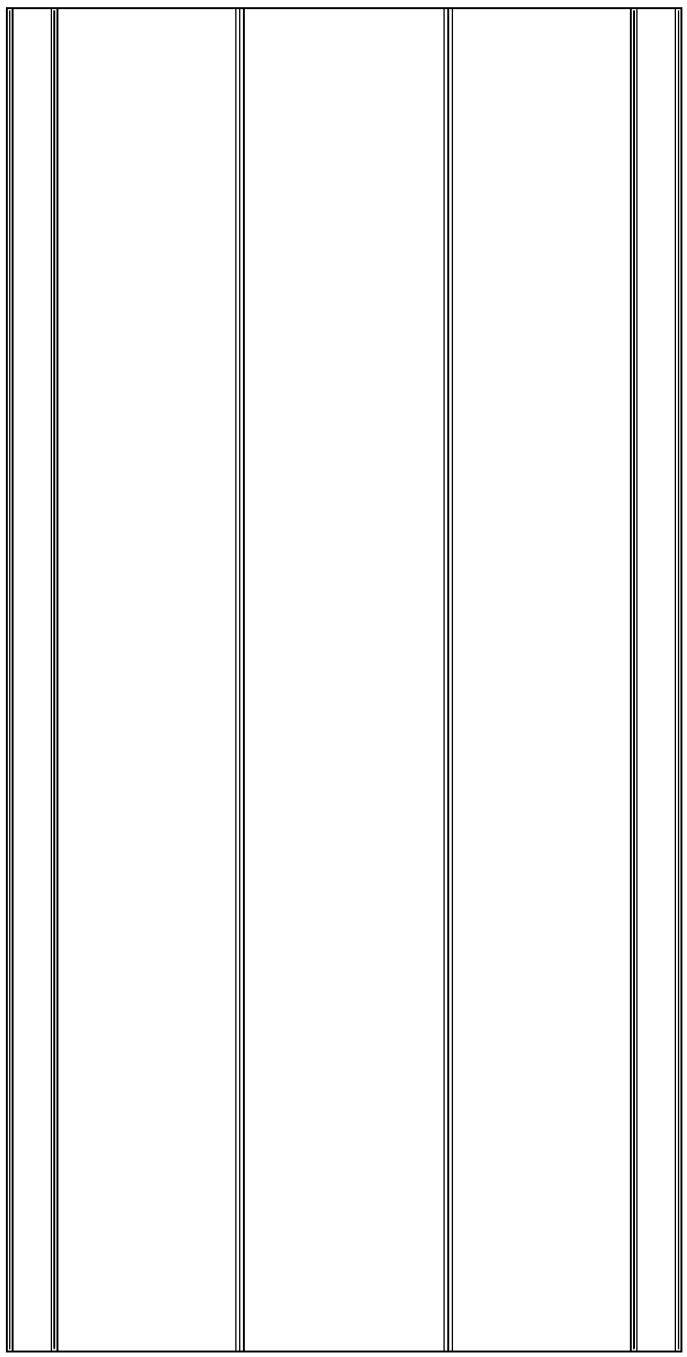
FIG. 50 is a left side view of the sidewall of FIG. 44.
Figure 51:
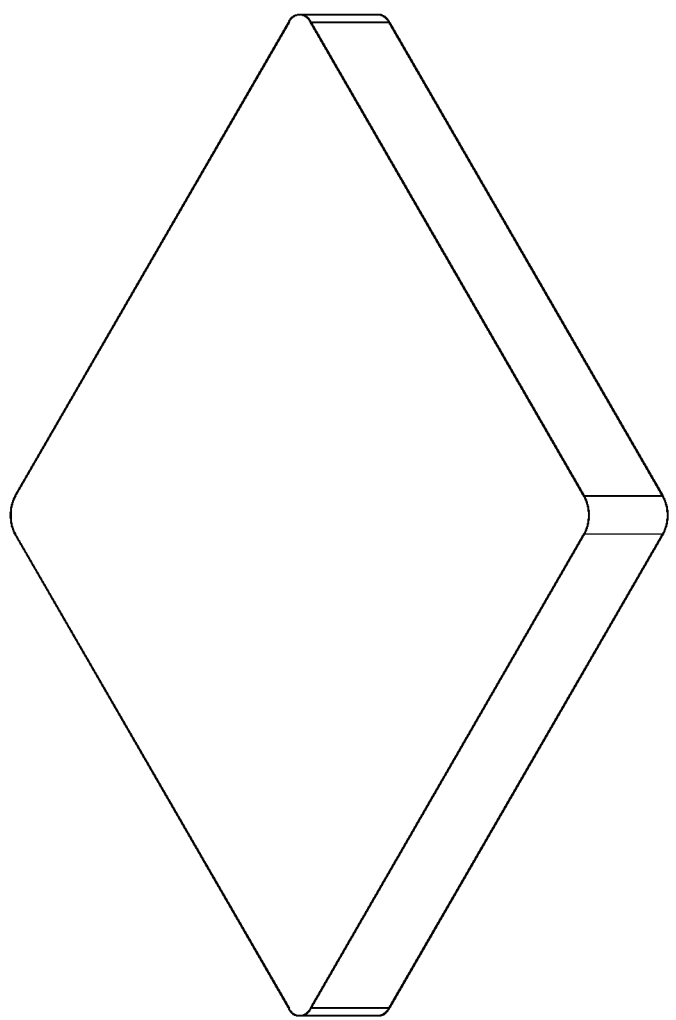
FIG. 51 is a perspective view of a support member made in accordance with the principles of the present disclosure.
Figure 52:
FIG. 52 is a right side view of the support member of FIG. 51.
Figure 53:
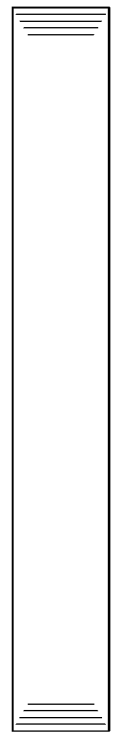
FIG. 53 is a left side view of the support member of FIG. 51.
Figure 54:
FIG. 54 is a front view of the support member of FIG. 51.
Figure 55:
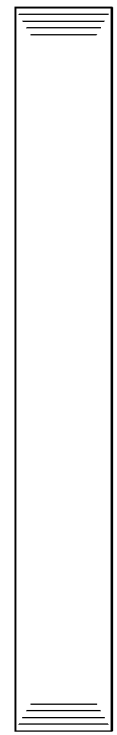
FIG. 55 is a rear view of the support member of FIG. 51.
Figure 57:
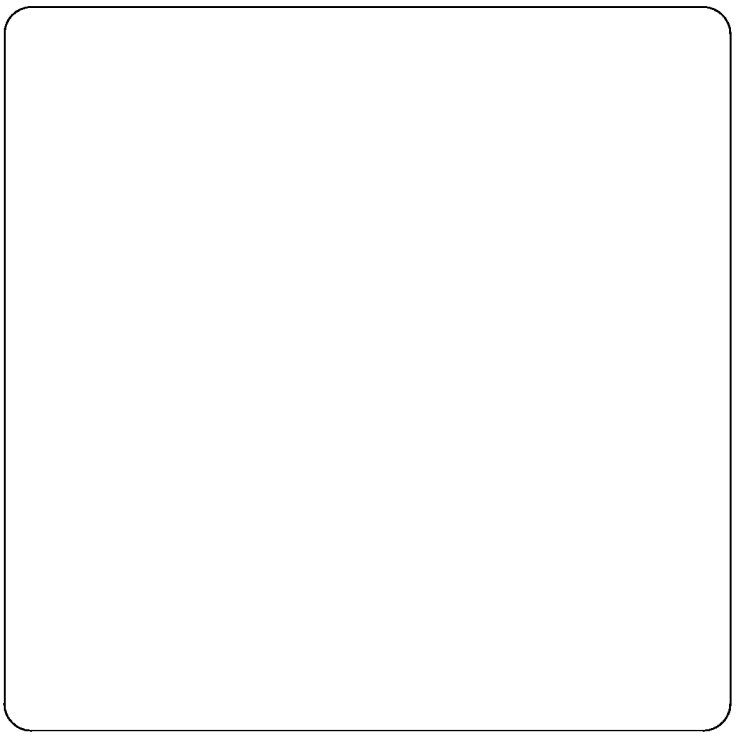
FIG. 57 is a bottom view of the support member of FIG. 51.
Figure 56:
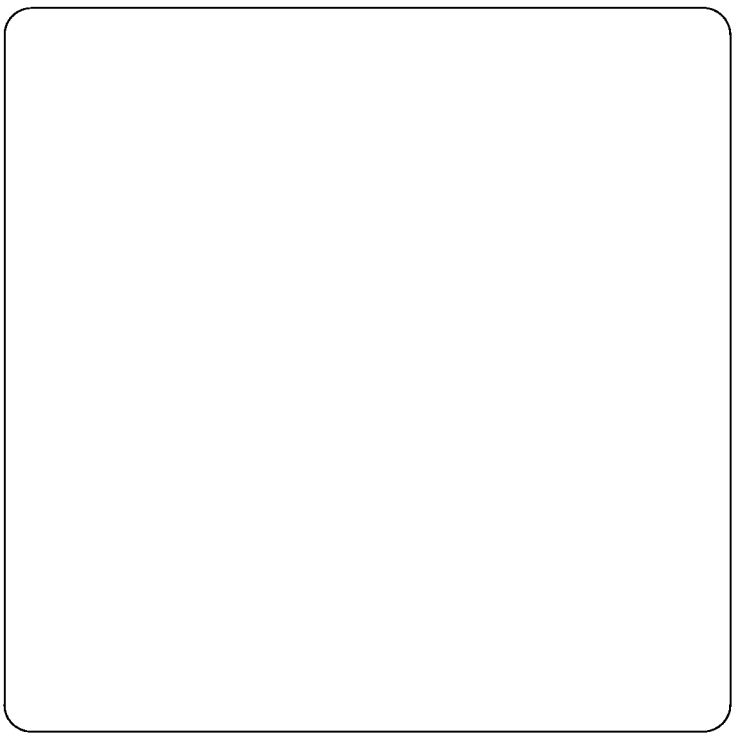
FIG. 56 is a top view of the support member of FIG. 51.
Figure 58:
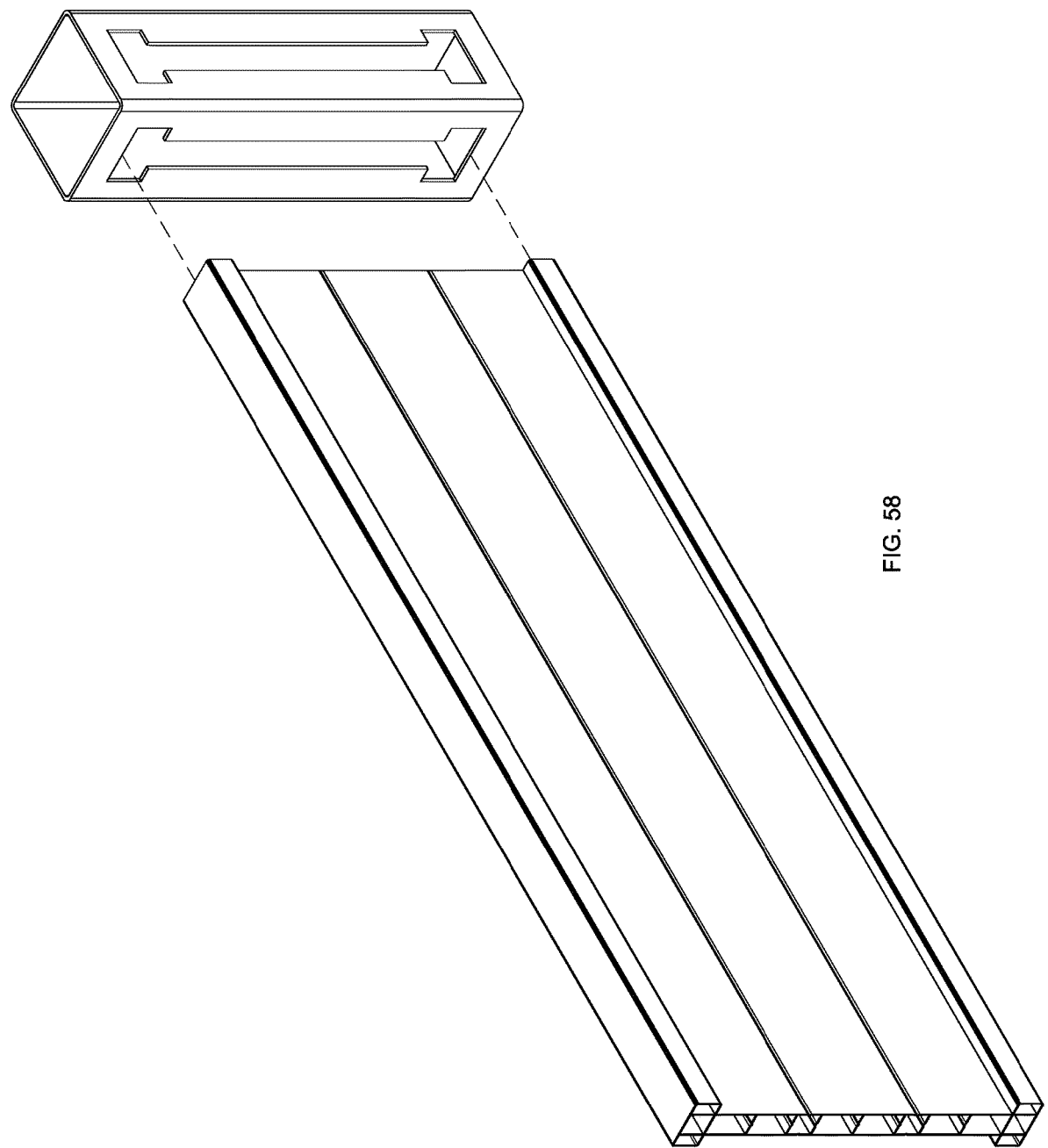
FIG. 58 is a exploded, perspective view of a sidewall with a corner post made in accordance with the principles of the present disclosure as part of a garden box assembly.
Figure 59:
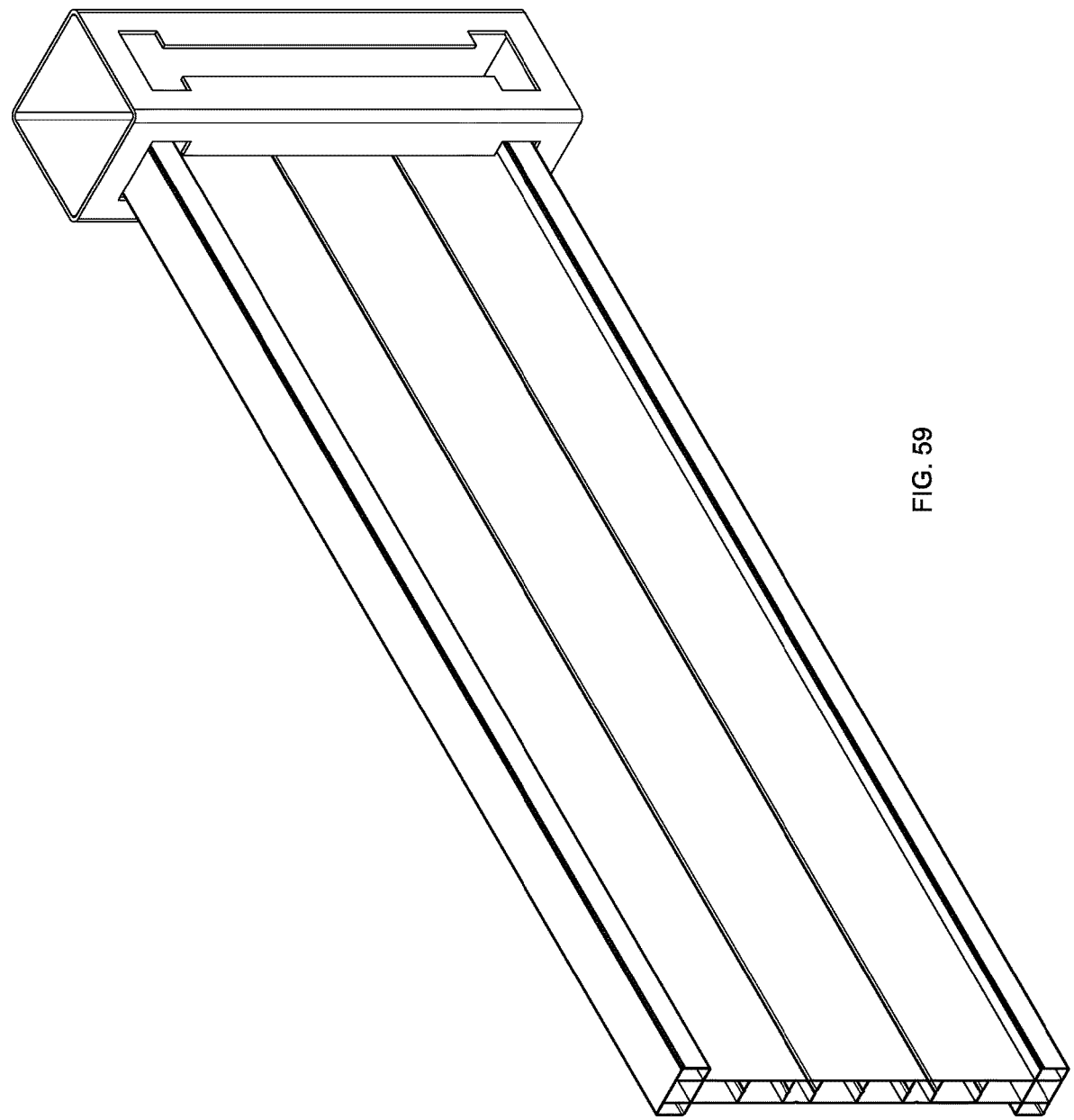
FIG. 59 is a perspective view of the sidewall and corner post of FIG. 58, in which the sidewall is shown inserted into the corner post.
Figure 60:
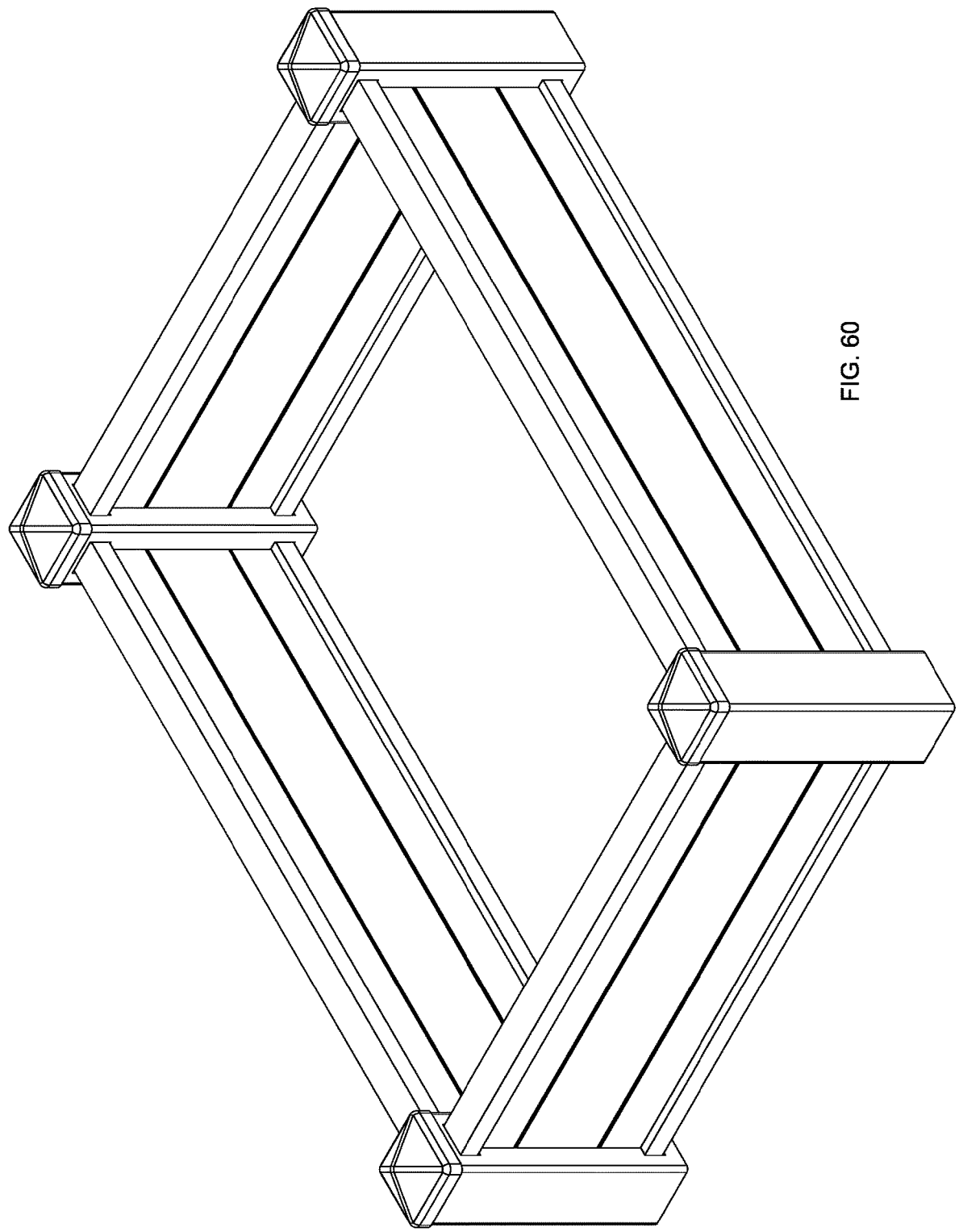
FIG. 60 is a perspective view of a 4-sided garden box assembly made in accordance with the principles of the present disclosure.

Referring now to FIGS. 9-61, it is to be understood that FIG. 9 is a perspective view of a corner post made in accordance with the principles of the present disclosure. FIG. 10 is a right side view of the corner post of FIG. 9. FIG. 11 is a left side view of the corner post of FIG. 9. FIG. 12 is a top view of the corner post of FIG. 9. FIG. 13 is a bottom view of the corner post of FIG. 9. FIG. 14 is a front view of the corner post of FIG. 9. FIG. 15 is a rear view of the corner post of FIG. 9. FIG. 16 is a first, alternative embodiment of the corner post of FIG. 9, made in accordance with the principles of the present disclosure and without limitation to any opening that could be formed therein. FIG. 17 is a right side view of the corner post of FIG. 16. FIG. 18 is a left side view of the corner post of FIG. 16. FIG. 19 is a top view of the corner post of FIG. 16. FIG. 20 is a bottom view of the corner post of FIG. 16. FIG. 21 is a front view of the corner post of FIG. 16. FIG. 22 is a rear view of the corner post of FIG. 16. FIG. 23 is a perspective view of a T-post made in accordance with the principles of the present disclosure. FIG. 24 is a right side view of the T-post of FIG. 23. FIG. 25 is a left side view of the of the T-post of FIG. 23. FIG. 26 is a top view of the of the T-post of FIG. 23. FIG. 27 is a bottom view of the of the T-post of FIG. 23. FIG. 28 is a front view of the of the T-post of FIG. 23. FIG. 29 is a rear view of the of the T-post of FIG. 23. FIG. 30 is a first, alternative embodiment of the T-post of FIG. 23, made in accordance with the principles of the present disclosure and without limitation to any opening that could be formed therein. FIG. 31 is a right side view of the T-post of FIG. 30. FIG. 32 is a left side view of the T-post of FIG. 30. FIG. 33 is a top view of the T-post of FIG. 30. FIG. 34 is a bottom view of the T-post of FIG. 30. FIG. 35 is a front view of the T-post of FIG. 30. FIG. 36 is a rear view of the T-post of FIG. 30. FIG. 37 is a perspective view of a sidewall made in accordance with the principles of the present disclosure. FIG. 38 is a top view of the sidewall of FIG. 37. FIG. 39 is a bottom view of the sidewall of FIG. 37. FIG. 40 is a front view of the side panel of FIG. 37. FIG. 41 is a rear view of the side panel of FIG. 37. FIG. 42 is a right side view of the side panel of FIG. 37. FIG. 43 is a left side view of the side panel of FIG. 37. FIG. 44 is a first, alternative embodiment of the sidewall of FIG. 43, made in accordance with the principles of the present disclosure and without limitation to any support ribs that could be formed therein. FIG. 45 is a top view of the sidewall of FIG. 44. FIG. 46 is a bottom view of the sidewall of FIG. 44. FIG. 47 is a front view of the sidewall of FIG. 44. FIG. 48 is a rear view of the sidewall of FIG. 44. FIG. 49 is a right side view of the sidewall of FIG. 44. FIG. 50 is a left side view of the sidewall of FIG. 44. FIG. 51 is a perspective view of a support member made in accordance with the principles of the present disclosure. FIG. 52 is a right side view of the support member of FIG. 51. FIG. 53 is a left side view of the support member of FIG. 51. FIG. 54 is a front view of the support member of FIG. 51. FIG. 55 is a rear view of the support member of FIG. 51. FIG. 56 is a top view of the support member of FIG. 51. FIG. 57 is a bottom view of the support member of FIG. 51. FIG. 58 is a exploded, perspective view of a sidewall with a corner post made in accordance with the principles of the present disclosure as part of a garden box assembly. FIG. 59 is a perspective view of the side panel and corner post of FIG. 58, in which the sidewall is shown inserted into the corner post. FIG. 60 is a perspective view of a 4-sided garden box assembly made in accordance with the principles of the present disclosure. FIG. 61 is a perspective view of a garden having two sections and made in accordance with the principles of the present disclosure.

Regarding the embodiments shown in FIGS. 9-61, the broken lines are shown for illustrative purposes only and form no part of any claimed design.

Those having ordinary skill in the relevant art will appreciate the advantages provide by the features of the present disclosure.

In the foregoing Detailed Description, various features of the present disclosure are grouped together in a single embodiment for the purpose of streamlining the disclosure. This method of disclosure is not to be interpreted as reflecting an intention that the claimed disclosure requires more features than are expressly recited in each claim. Rather, as the following claims reflect, inventive aspects lie in less than all features of a single foregoing disclosed embodiment. Thus, the following claims are hereby incorporated into this Detailed Description of the Disclosure by this reference, with each claim standing on its own as a separate embodiment of the present disclosure.

It is to be understood that the above-described arrangements are only illustrative of the application of the principles of the present disclosure. Numerous modifications and alternative arrangements may be devised by those skilled in the art without departing from the spirit and scope of the present disclosure and the appended claims are intended to cover such modifications and arrangements. Thus, while the present disclosure has been shown in the drawings and described above with particularity and detail, it will be apparent to those of ordinary skill in the art that numerous modifications, including, but not limited to, variations in size, materials, shape, form, function and manner of operation, assembly and use may be made without departing from the principles and concepts set forth herein.

What is claimed is:

1. A raised garden box assembly comprising:
    a plurality of hollow sidewalls, each hollow sidewall having a top rail, a bottom rail, an inner side member and an outer side member, wherein the top rail is connected to an outer side member and an inner side member and the bottom rail is also connected to the inner side member and the outer side member;
    wherein the outer side member and the inner side member form a hollow interior space, and wherein each of the plurality of hollow sidewalls includes a plurality of support ribs, wherein each of the plurality of support ribs directly contacts the outer side member and the inner side member;
    wherein the top rail, bottom rail, outer side member, inner side member and plurality of support ribs of each hollow sidewall are integrally formed as a single unitary piece via an extrusion process;
    a plurality of hollow corner posts, each corner post having a first and second opening, the first and second openings being through-holes into an interior space of the hollow corner post, wherein each of the first and second openings receive a terminating end of one of the plurality of hollow sidewalls, the terminating end including at least a portion of the top rail, the bottom rail, the inner side member and the outer side member of the one of the plurality of sidewalls, the plurality of hollow sidewalls and corner posts forming an enclosure; and
    a first and second T-post positioned between at least two of the plurality of hollow corner posts, each of the first and second T-posts having at least three openings to receive at least three hollow sidewalls, wherein at least one of the hollow sidewalls is an intermediate sidewall interposed between the first and second T-posts, bifurcating the enclosure formed by the plurality of hollow sidewalls.

2. The raised garden box assembly of claim 1, wherein the top rail further comprises a top wall connected to an outer wall and an inner wall, the outer wall connected to an outer overhang which connects with the outer side member, and the inner wall is connected to an inner overhang which connects with the inner side member, wherein the top wall, outer wall, inner wall, outer overhang and inner overhang form a portion of the hollow interior space.

3. The raised garden box assembly of claim 2, further comprising:
    a first support rib connected to the outer side member and the inner side member and coplanar with the outer overhang and the inner overhang.

4. The raised garden box assembly of claim 1, wherein the bottom rail having a bottom wall connected to an outer wall and an inner wall, the outer wall connected to an outer overhang which connects with the outer side member, and the inner wall is connected to an inner overhang which connects with the inner side member, wherein the bottom wall, outer wall, inner wall, outer overhang and inner overhang form a portion of the hollow interior space.

5. The raised garden box assembly of claim 2, further comprising:
    a support member having a cross-sectional shape substantially the same as an interior space of the hollow corner post, wherein the support member is positioned within the corner post and fastened to the terminating end of one of the plurality of hollow sidewalls.

6. The raised garden box assembly of claim 1, further comprising:
a support member removable secured to at least one of the plurality of hollow sidewalls within at least one of the plurality of hollow corner posts.

7. The raised garden box assembly of claim 1, wherein each of the plurality of support ribs are non-planar.

8. The raised garden box assembly of claim 2, further comprising:
a first support rib connected to the outer side member and the inner side member and aligned with the outer overhang and the inner overhang.

9. The raised garden box assembly of claim 1, wherein the plurality of hollow sidewalls collectively form a quadrilateral shape without vertices.

10. A raised garden box assembly comprising:
a plurality of hollow sidewalls, each hollow sidewall having a top rail, an inner side member and an outer side member, wherein the top rail is connected to a top portion of the outer side member and a top portion of the inner side member,
the top rail having a top wall connected to an outer wall and an inner wall, the outer wall connected to an outer overhang which connects with the outer side member, and the inner wall is connected to an inner overhang which connects with the inner side member, wherein the top wall, outer wall, inner wall, outer overhang and inner overhang form a hollow interior space;
a plurality of support ribs positioned within the hollow interior space, including a first support rib connected to the outer side member and the inner side member and aligned with the outer overhang and the inner overhang, wherein each of the plurality of support ribs are non-planar; and
a plurality of hollow corner posts, each corner post having a first and second opening, the first and second openings being through-holes into an interior space of the hollow corner post, wherein each of the first and second openings are I-shaped to receive a terminating end of one of the plurality of hollow sidewalls, the plurality of hollow sidewalls and corner posts forming an enclosure.

11. The raised garden box assembly of claim 10, wherein the top rail, outer side member, inner side member and plurality of support ribs of each hollow sidewall are integrally formed as a single unitary piece via an extrusion process.

12. The raised garden box assembly of claim 10, further comprising: a bottom rail, the bottom rail having a bottom wall connected to an outer wall and an inner wall, the outer wall connected to an outer overhang which connects with the outer side member, and the inner wall is connected to an inner overhang which connects with the inner side member, wherein the bottom wall, outer wall, inner wall, outer overhang and inner overhang form a portion of the hollow interior space.

13. The raised garden box assembly of claim 12, further comprising:
a first support rib connected to the outer side member and the inner side member and aligned with the outer overhang and the inner overhang of the bottom rail.

14. The raised garden box assembly of claim 10, further comprising:
a support member having a cross-sectional shape substantially the same as an interior space of the hollow corner post, wherein the support member is positioned within the corner post and fastened to the terminating end of one of the plurality of hollow sidewalls.

15. The raised garden box assembly of claim 10, wherein the first support rib is coplanar with the outer overhang and the inner overhang of the top rail.

16. The raised garden box assembly of claim 10, further comprising:
a support member removable secured to at least one of the plurality of hollow sidewalls within at least one of the plurality of hollow corner posts.

17. The raised garden box assembly of claim 10, wherein the plurality of hollow sidewalls collectively form a quadrilateral shape without vertices.

18. The raised garden box assembly of claim 13, wherein the first support rib is coplanar with the outer overhang and the inner overhang of the bottom rail.

19. A raised garden box assembly comprising:
a plurality of hollow sidewalls, each sidewall having a bottom rail, wherein the bottom rail is connected to a bottom portion of an outer side member and a bottom portion of an inner side member,
the bottom rail having a bottom wall connected to an outer wall and an inner wall, the outer wall connected to an outer overhang which connects with the outer side member, and the inner wall is connected to an inner overhang which connects with the inner side member, wherein the bottom wall, outer wall, inner wall, outer overhang and inner overhang form a hollow interior space;
a plurality of support ribs positioned within the hollow interior space, including a first support rib connected to the outer side member and the inner side member and aligned with the outer overhang and the inner overhang, wherein each of the plurality of support ribs are non-planar; and
a plurality of hollow corner posts, each corner post having a first and second opening, the first and second openings being through-holes into an interior space of the hollow corner post, wherein each of the first and second openings are I-shaped to receive a terminating end of one of the plurality of hollow sidewalls, the plurality of hollow sidewalls and corner posts forming an enclosure.

20. The raised garden box assembly of claim 19, further comprising: a top rail, the top rail having a top wall connected to an outer wall and an inner wall, the outer wall connected to an outer overhang which connects with the outer side member, and the inner wall is connected to an inner overhang which connects with the inner side member, wherein the top wall, outer wall, inner wall, outer overhang and inner overhang form a portion of the hollow interior space.

21. The raised garden box assembly of claim 20, further comprising:
a first support rib connected to the outer side member and the inner side member and aligned with the outer overhang and the inner overhang of the top rail.

22. The raised garden box assembly of claim 19, wherein the bottom rail, outer side member, inner side member and plurality of support ribs of each hollow sidewall are integrally formed as a single unitary piece via an extrusion process.

23. The raised garden box assembly of claim 19, further comprising:
a support member having a cross-sectional shape substantially the same as an interior space of the hollow corner post, wherein the support member is positioned within the corner post and fastened to the terminating end of one of the plurality of hollow sidewalls.

24. The raised garden box assembly of claim 19, wherein the first support rib is coplanar with the outer overhang and the inner overhang of the bottom rail.

25. The raised garden box assembly of claim 19, further comprising:
a support member removable secured to at least one of the plurality of hollow sidewalls within at least one of the plurality of hollow corner posts.

26. The raised garden box assembly of claim 19, wherein the plurality of hollow sidewalls collectively form a quadrilateral shape without vertices.

27. The raised garden box assembly of claim 21, wherein the first support rib is coplanar with the outer overhang and the inner overhang of the top rail.

28. A raised garden box assembly comprising:
a plurality of hollow sidewalls, each sidewall having a top rail and a bottom rail, wherein the top rail is connected to an outer side member and an inner side member and the bottom rail is also connected to the inner side member and the outer side member,
wherein the outer side member and the inner side member form a hollow interior space and each of the plurality of hollow sidewalls includes a plurality of support ribs, wherein each of the plurality of support ribs directly contacts the outer side member and the inner side member, and each of the plurality of support ribs are non-planar;
wherein the top rail, bottom rail, outer side member, inner side member and plurality of support ribs of each hollow sidewall are integrally formed as a single unitary piece;
a plurality of hollow corner posts, each corner post having a first and second openings, the first and second openings being through-holes into an interior space of the hollow corner post, wherein each of the first and second openings receive a terminating end of one of the plurality of hollow sidewalls, the terminating end including at least a portion of the top rail, the bottom rail, the inner side member and the outer side member of the one of the plurality of sidewalls, the plurality of hollow sidewalls and corner posts forming an enclosure.

29. The raised garden box assembly of claim 28, wherein the top rail having a top wall connected to an outer wall and an inner wall, the outer wall connected to an outer overhang which connects with the outer side member, and the inner is connected to an inner overhang which connects with the inner side member, wherein the top wall, outer wall, inner wall, outer overhang and inner overhang form a portion of the hollow interior space.

30. The raised garden box assembly of claim 29, further comprising:
a first support rib connected to the outer side member and the inner side member and aligned with the outer overhang and the inner overhang of the top rail.

31. The raised garden box assembly of claim 28, wherein the bottom rail having a bottom wall connected to an outer wall and an inner wall, the outer wall connected to an outer overhang which connects with the outer side member, and the inner wall is connected to an inner overhang which connects with the inner side member, wherein the bottom wall, outer wall, inner wall, outer overhang and inner overhang form a portion of the hollow interior space.

32. The raised garden box assembly of claim 31, further comprising:
a first support rib connected to the outer side member and the inner side member and aligned with the outer overhang and the inner overhang of the bottom rail.

33. The raised garden box assembly of claim 28, further comprising:
a support member having a cross-sectional shape substantially the same as an interior space of the hollow corner post, wherein the support member is positioned within the corner post and fastened to the terminating end of one of the plurality of hollow sidewalls.

34. The raised garden box assembly of claim 28, wherein the top rail, bottom rail, outer side member, inner side member and plurality of support ribs of each hollow sidewall are integrally formed as a single unitary piece via an extrusion process.

35. The raised garden box assembly of claim 29, wherein the first support rib is coplanar aligned with the outer overhang and the inner overhang of the top rail.

36. The raised garden box assembly of claim 28, further comprising:
a support member removable secured to at least one of the plurality of hollow sidewalls within at least one of the plurality of hollow corner posts.

37. The raised garden box assembly of claim 28, wherein the plurality of hollow sidewalls collectively form a quadrilateral shape without vertices.

38. A raised garden box assembly comprising:
a plurality of hollow sidewalls, each sidewall having a top rail and a bottom rail, wherein the top rail is connected to an outer side member and an inner side member and the bottom rail is also connected to the inner side member and the outer side member,
wherein the outer side member and the inner side member form a hollow interior space and each of the plurality of hollow sidewalls includes a plurality of support ribs, wherein each of the plurality of support ribs directly contacts the outer side member and the inner side member;
a plurality of hollow corner posts, each corner post having a first and second opening, the first and second openings being through-holes into an interior space of the hollow corner post, wherein each of the first and second openings receive a terminating end of one of the plurality of hollow sidewalls, the terminating end including at least a portion of the top rail, the bottom rail, the inner side member and the outer side member of the one of the plurality of sidewalls, the plurality of hollow sidewalls and corner posts forming an enclosure;
a first and second T-post positioned between at least two of the plurality of hollow corner posts, each of the first and second T-posts having at least three openings to receive at least three hollow sidewalls, wherein at least one of the hollow sidewalls is an intermediate sidewall interposed between the first and second T-posts, bifurcating the enclosure formed by the plurality of hollow sidewalls; and
a reinforcement plate removable secured to at least one of the plurality of hollow sidewalls within at least one of the plurality of hollow corner posts.

39. The raised garden box assembly of claim 38, wherein the reinforcement plate has a cross-sectional shape substantially the same as an interior space of the hollow corner post, wherein the reinforcement plate is positioned within the corner post and fastened to the terminating end of one of the plurality of hollow sidewalls.

40. The raised garden box assembly of claim 38, wherein the top rail having a top wall connected to an outer wall and an inner wall, the outer wall connected to an outer overhang which connects with the outer side member, and the inner wall is connected to an inner overhang which connects with the inner side member, wherein the top wall, outer wall, inner wall, outer overhang and inner overhang form a portion of the hollow interior space.

41. The raised garden box assembly of claim 40, further comprising:
a first support rib connected to the outer side member and the inner side member and aligned with the outer overhang and the inner overhang of the top rail.

42. The raised garden box assembly of claim 38, wherein the bottom rail having a bottom wall connected to an outer wall and an inner wall, the outer wall connected to an outer overhang which connects with the outer side member, and the inner wall is connected to an inner overhang which connects with the inner side member, wherein the bottom wall, outer wall, inner wall, outer overhang and inner overhang form a portion of the hollow interior space.

43. The raised garden box assembly of claim 42, further comprising:
a first support rib connected to the outer side member and the inner side member and aligned with the outer overhang and the inner overhang of the bottom rail.

44. The raised garden box assembly of claim 38, wherein the top rail, bottom rail, outer side member, inner side member and plurality of support ribs of each hollow sidewall are integrally formed as a single unitary piece via an extrusion process.

45. The raised garden box assembly of claim 38, wherein each of the plurality of support ribs are non-planar.

46. The raised garden box assembly of claim 41, wherein the first support rib is coplanar with the outer overhang and the inner overhang of the top rail.

47. The raised garden box assembly of claim 38, wherein the plurality of hollow sidewalls collectively form a quadrilateral shape without vertices.

48. A raised garden box assembly comprising:
a plurality of hollow sidewalls, each hollow sidewall having a top rail, a bottom rail, an inner side member and an outer side member, wherein the top rail is connected to an outer side member and an inner side member and the bottom rail is also connected to the inner side member and the outer side member, and each outer side member and inner side member includes at least one outer side member channel and inner side member channel, respectively, and each outer side member channel and inner side member channel extend an entire length of the corresponding hollow sidewall;
wherein the outer side member and the inner side member form a hollow interior space, and wherein each of the plurality of hollow sidewalls includes a plurality of support ribs, wherein each of the plurality of support ribs directly contacts the outer side member and the inner side member, and each of the plurality of support ribs are non-planar;
wherein the top rail, bottom rail, outer side member, inner side member and plurality of support ribs of each hollow sidewall are integrally formed as a single unitary piece via an extrusion process, the top rail having a top wall connected to an outer wall and an inner wall, the outer wall connected to an outer overhang which connects with the outer side member, and the inner wall is connected to an inner overhang which connects with the inner side member, wherein the top wall, outer wall, inner wall, outer overhang and inner overhang form a portion of the hollow interior space,
wherein the bottom rail having a bottom wall connected to an outer wall and an inner wall, the outer wall connected to an outer overhang which connects with the outer side member, and the inner wall is connected to an inner overhang which connects with the inner side member, wherein the bottom wall, outer wall, inner wall, outer overhang and inner overhang form a portion of the hollow interior space,
a first support rib connected to the outer side member and the inner side member and coplanar with the outer overhang and the inner overhang of the top rail;
a plurality of hollow corner posts, each corner post having a first and second opening, wherein each of the first and second openings receive a terminating end of one of the plurality of hollow sidewalls, the plurality of hollow sidewalls and corner posts forming an enclosure, and the plurality of hollow sidewalls collectively form a quadrilateral shape without vertices;
a first and second T-post positioned between at least two of the plurality of hollow corner posts, each of the first and second T-posts having at least three openings to receive at least three hollow sidewalls, wherein at least one of the hollow sidewalls is an intermediate sidewall interposed between the first and second T-posts, bifurcating the enclosure formed by the plurality of hollow sidewalls;
a top support member having a cross-sectional shape substantially the same as an interior space of at least one of the plurality of hollow corner posts, wherein the top support member is positioned within the corner post and fastened to the terminating end of one of the plurality of hollow sidewalls;
a bottom support member having a cross-sectional shape substantially the same as the interior space of the at least one hollow corner post, wherein the bottom support member is positioned within the corner post and fastened to the terminating end of one of the plurality of hollow sidewalls; and
an enclosure cap connected to at least one of the hollow corner posts and configured to enclose and substantially seal the hollow interior space of the corner post.

* * * * *